United States Patent
Xiong et al.

(10) Patent No.: US 6,721,315 B1
(45) Date of Patent: Apr. 13, 2004

(54) CONTROL ARCHITECTURE IN OPTICAL BURST-SWITCHED NETWORKS

(75) Inventors: Yijun Xiong, Plano, TX (US); Marc L. J. Vandenhoute, Dallas, TX (US); Hakki C. Cankaya, Dallas, TX (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/409,573

(22) Filed: Sep. 30, 1999

(51) Int. Cl.$^7$ ................................................ H04L 12/56
(52) U.S. Cl. ........................ 370/389; 359/124; 359/128
(58) Field of Search ................................. 370/389–396, 370/222–225, 351, 338, 410–413, 397, 474, 392, 471, 355, 356, 390; 359/120–139, 121, 133, 124

(56) References Cited

U.S. PATENT DOCUMENTS

| | | | |
|---|---|---|---|
| 5,416,769 A | 5/1995 | Karol | 370/60 |
| 5,469,284 A | 11/1995 | Haas | 359/139 |
| 5,486,943 A | 1/1996 | Sasayama et al. | 359/123 |
| 5,724,351 A * | 3/1998 | Chao et al. | 370/395 |
| 5,729,548 A * | 3/1998 | Holender | 370/474 |
| 5,734,486 A | 3/1998 | Guillemot et al. | 359/139 |
| 5,737,106 A | 4/1998 | Sansonetti et al. | 359/140 |
| 5,943,150 A * | 8/1999 | Deri et al. | 359/133 |
| 6,088,358 A * | 7/2000 | Tomita et al. | 370/395 |
| 6,233,075 B1 * | 5/2001 | Chang et al. | 359/124 |
| 6,271,946 B1 * | 8/2001 | Chang et al. | 359/124 |
| 6,335,935 B2 * | 1/2002 | Kadambi et al. | 370/396 |
| 6,466,343 B1 * | 10/2002 | Lahat et al. | 359/128 |
| 6,519,062 B1 * | 2/2003 | Yoo | 359/128 |
| 6,545,781 B1 * | 4/2003 | Chang et al. | 359/124 |

OTHER PUBLICATIONS

*A Flexible Cross–Connect Network Using Multiple Optical Carriers*, by G. Depovere, et al. of Philips Research Laboratories, The Netherlands and N. Wauters, et al. of IMEC–LEA, University of Gent, Belgium (4 pgs.).

*Terabit Burst Switching*, Jonathan S. Turner, Journal of High Speed Networks, IOS Press, pp. 3–16.

* cited by examiner

Primary Examiner—Wellington Chin
Assistant Examiner—Prenell Jones
(74) Attorney, Agent, or Firm—Gray, Cary, Ware & Friedenrich LLP; Jessica W. Smith; V. Lawrence Sewell

(57) ABSTRACT

A control architecture for an optical burst-switched network includes an electronic ingress edge router, a switch control unit at each hop, and an electronic egress edge router. The electronic ingress edge router assembles multiple data packets into a burst. The switch control units at each hop configure the optical switching matrix to switch the burst through the optical burst-switched network. Finally, the electronic egress edge router receives the burst from the optical burst-switched network and disassembles the burst into multiple data packets.

43 Claims, 13 Drawing Sheets

CONTROL ARCHITECTURE IN OPTICAL BURST-SWITCHED NETWORKS

TECHNICAL FIELD OF THE INVENTION

The present invention relates generally to optical network systems, and more particularly, a system and method for providing a control architecture in an optical burst-switched network.

BACKGROUND OF THE INVENTION

Data traffic over networks, particularly the internet, has increased dramatically over the past several years, and this trend will continue with increasing number of users and the introduction of new services which require more bandwidth. The enlarged volume of internet traffic requires a network with high capacity routers capable of routing data packets with variable lengths. One option is the use of optical networks. However, current optical networks use only a small fraction of the bandwidth available on a single optical fiber.

The emergence of dense-wavelength division multiplexing (DWDM) technology has helped to overcome the bandwidth problem encountered by current optical networks. A single DWDM optical fiber has the capability of carrying as much as ten terabits of data per second. However, this creates a serious mismatch with current switching technologies which are capable of switching data at rates of up to a few gigabits per second. While emerging ATM switches and IP routers can be used to switch data using the individual channels within a DWDM fiber, typically at 2.4 gigabits per second or ten gigabits per second, this approach implies that tens or hundreds of switch interfaces must be used to terminate a single DWDM fiber with a large number of channels. This could lead to a significant loss of statistical multiplexing efficiency when the parallel channels are used simply as a collection of independent links, rather than as a shared resource.

Different approaches advocating the use of optical technology in place of electronics in switching systems have been proposed, however the limitations of optical component technology has largely limited optical switching to facility management applications. One approach, called optical burst-switched networking, attempts to make the best use of optical and electronic switching technologies. The electronics provides dynamic control of system resources by assigning individual user data bursts to channels of a DWDM fiber, while optical technology is used to switch the user data channels entirely in the optical domain.

Previous optical burst-switched networks designed to directly handle end-to-end user data channels have been disappointing and have shown the limitations of current optical components. For example, one prior art optical burst-switched network utilized ATM switches in the control network which made the design of the control network much more complicated and less efficient. Other prior art optical burst-switched networks used electronic buffers in the optical routers, thus the optical burst-switched network was not purely optical. The electronic buffers did not provide end-to-end transparent optical paths for data bursts. Thus, little has been done to stimulate any serious move toward optical burst-switching networks.

SUMMARY OF THE INVENTION

The present invention provides a packet switching system and method that substantially eliminates or reduces disadvantages and problems associated with previously developed packet switching systems and methods used for switching data packets across a network.

More specifically, the present invention provides an optical burst-switching control architecture for switching data packets entirely in the optical domain. The control architecture for an optical burst-switched network includes an electronic ingress edge router, a switch control unit at each hop, and an electronic egress edge router. The electronic ingress edge router assembles multiple data packets into a burst. The switch control units at each hop configure the optical switching matrix to switch the burst through the optical burst-switched network. Finally, the electronic egress edge router receives the burst from the optical burst-switched network and disassembles the burst into multiple data packets.

The present invention provides an important technical advantage by providing a purely optical network, thus providing end-to-end optical paths for data bursts.

The present invention provides another technical advantage by using conventional IP routers rather than ATM switches, thus simplifying the design of the pure optical network's control architecture.

The present invention provides another important technical advantage by providing an optical network with increased bandwidth per optical fiber, thus lowering the cost and increasing demand for bandwidth.

The present invention provides another technical advantage by providing an edge router and burst assembly mechanism which assembles data packets into bursts and forwards them to the core optical network according to an optical burst-switching protocol, thus circumventing potential bottlenecks of electronic processing.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

Figure 1:
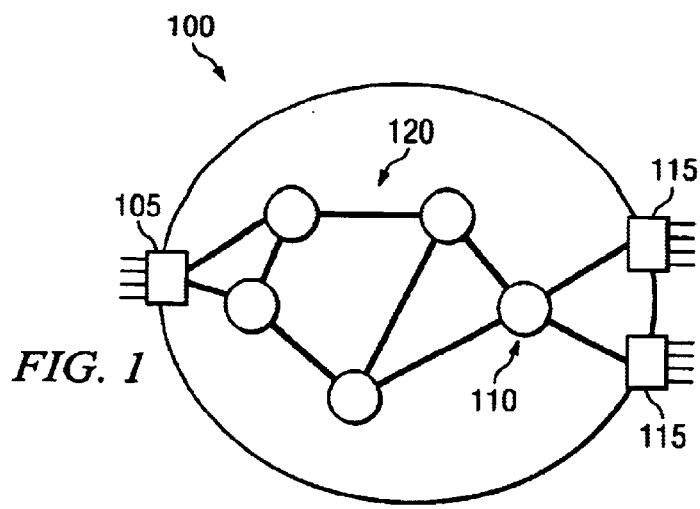
FIG. 1 shows one example of an optical burst-switched network.

FIG. 1 shows one example of an optical burst-switched network 100. The optical burst switched network 100 includes multiple electronic ingress edge routers 105, multiple optical core routers 110, multiple electronic egress edge routers 115, and multiple DWDM optical links 120. The multiple dense-wavelength division multiplexing (DWDM) optical links 120 connect the electronic ingress edge routers 105, the optical core routers 110, and the electronic egress edge routers 115 together. The electronic ingress edge routers 105 and the electronic egress edge routers 115 perform burst assembly and disassembly functions, respectively, and serve as legacy interfaces between the optical burst-switched network 100 and conventional electronic routers.

A burst, the basic data block to be transferred through the optical burst-switched network 100, is a collection of data packets which have the same destination or destinations and other attributes such as quality of service (QoS) requirements. A burst consists of a burst header packet (BHP) and a burst payload. The format of the burst header packet consists of an IP header (e.g., IPv4, IPv6) or a MPLS shim header if MPLS is used or both, together with the following optical burst switching specific information which will be used by switch control units in optical core routers 110 to route bursts and by electronic egress edge routers 115 to receive bursts. The optical burst switching specific information includes:

(1) synchronization hint, containing hints for the receiving egress edge router synchronization; (2) offset time, specifying the offset time from the first bit of a burst header packet 215 to the first bit of a burst payload 220; (3) burst duration, specifying the duration of a burst payload 220; (4) burst bit rate, giving the bit rate at which the burst payload 215 is transmitted; (5) data channel identifier, specifying the identifier (ID) of the data channel on which the burst payload 215 is sent; (6) QoS, specifying the quality of service to be received by the burst payload 215; (7) burst sequence number, identifying bursts having the same electronic ingress and egress edge router addresses (bursts may arrive out of order even if they follow the same path); and (8) cyclic redundancy check.

Figure 2:
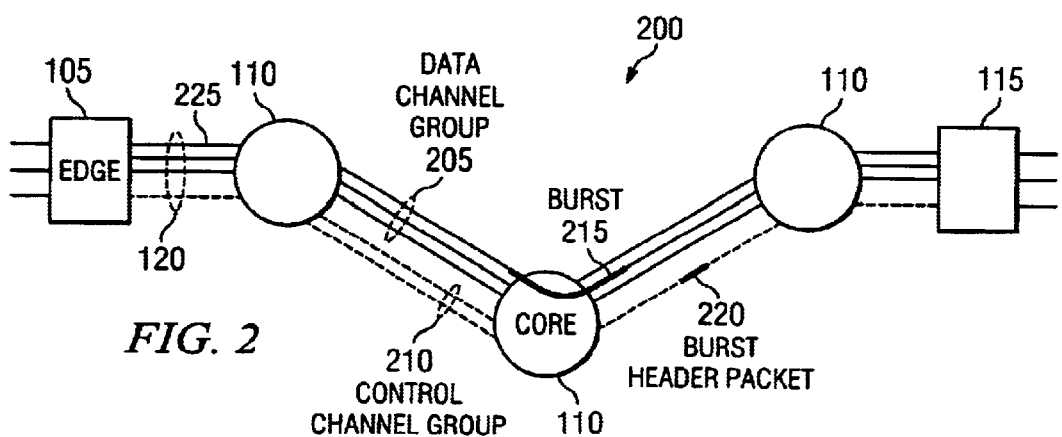
FIG. 2 shows a detailed example of how bursts are transmitted through an optical burst-switched network.

FIG. 2 shows a detailed example 200 of how bursts are transmitted through the optical burst-switched network 100. FIG. 2 shows an electronic ingress edge router 105, multiple optical core routers 110, and an electronic egress edge router 115 interconnected by DWDM links 120. A DWDM link 120 represents the total transmission capacity between two adjacent routers and include multiple channels 225. Each channel 225 is the unidirectional transmission capacity (in bits per second) between two adjacent routers and may consist of one wavelength or a portion of a wavelength, in the case of using time-division multiplexing. A channel group is a set of channels 225 with a common type and node adjacency. A DWDM link 120 consists of a data channel group (DCG) 205 and a control channel group (CCG) 210 in each direction.

An important feature of the optical burst switched network 100 is the separate transmission and switching of the burst payload 215 and burst header packets 220. Data packets are first received at the electronic ingress edge routers 105 from conventional electronic routers and assembled into bursts. Once the data packets have been assembled into bursts and the burst header packets 220 are stripped from the burst, the burst header packets 220 are then transmitted along the control channel group 210 and electronically processed at each optical core router 110. The burst payload 215 is transmitted along the data channel group 205 as illustrated in FIG. 2, however, it is not electronically processed. The burst payload 215 is a pure optical signal being transmitted along the pure optical burst switched network 100. The burst header packet 220 is then used at the electronic egress edge router 115 to receive the burst payload 215. Finally, the burst payload 215 is disassembled back into data packets at the electronic egress edge routers 115 to be forwarded to their next hops.

This feature facilitates the electronic processing of headers and provides ingress-egress transparent optical paths in the optical burst-switched network 100 for transporting bursts. Each burst header packet 220 contains the necessary routing information to be used by the optical core routers 110 to route the associated burst payload 215 in such a way that the burst payload 215 flies through the optical switching matrix in each optical core router 110.

Figure 3:
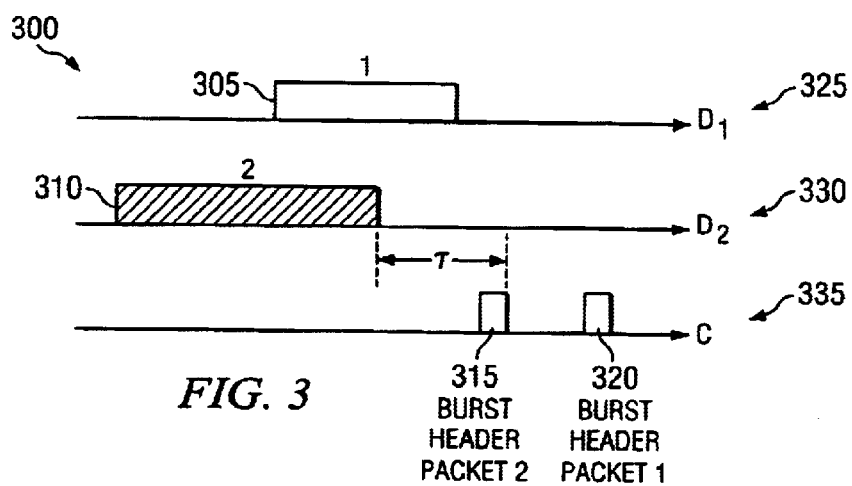
FIG. 3 illustrates the transmission time of a burst payload and its associated burst header packet.

FIG. 3 illustrates 300 the transmission time of a burst payload 215 and its associated burst header packet 220. FIG. 3 shows a first burst payload 305 traveling on data channel one 325, a second burst payload 310 traveling on data channel two (2) 330, and burst header packet one 320 and burst header packet two 315 traveling on control channel 335. The initial burst offset time $\tau_0$ is set by an electronic ingress edge router 105, which may be the same for all bursts or may differ from burst to burst. A burst header packet 220 will be sent no later in time than the burst payload 215 with a non-negative offset time $\tau$. At each hop the burst traverses, the optical core router 110 tries to "resynchronize" each burst header packet 220 (say the second burst header packet 315) and its associated burst payload 215 (say the second burst payload 310) to keep the offset time $\tau$ as close as possible to $\tau_0$. The purpose of using the offset time $\tau$ is to resolve the burst header packet 220 contention on the outbound control channel groups 555 of optical core routers 110.

Figure 4:
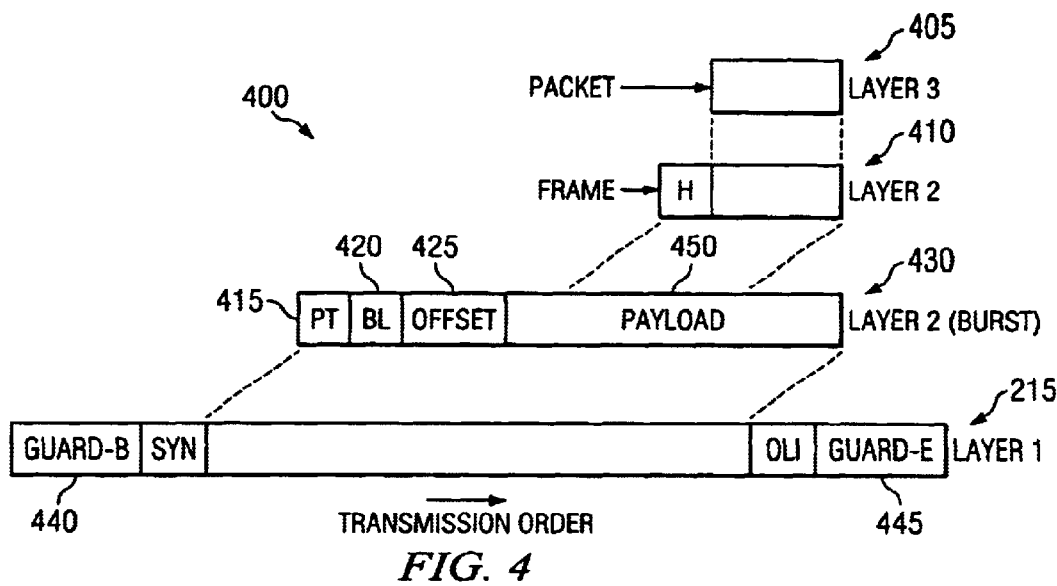
FIG. 4 shows an example of the burst payload format according to the present invention.

An example of the burst payload 215 format 400 is shown in FIG. 4. Each data packet 405 is delineated within the actual payload 450 using a frame header (H) 410. One example of the frame header 410 is the length of the data packet 405 in bytes. The burst payload 215 also includes the payload type (PT) 415, burst length (BL) 420, and the offset 425 of padding. The payload type 415 is an option indicating the type of data packets 405 in the actual payload 450. The burst length 420 indicates the length of the burst 430 in bytes starting from the first byte. The offset 425 indicates the first byte of padding. Padding may be required if a minimum length of burst payload 215 is imposed. In FIG. 4, the synchronization pattern 455 in layer one (1) is used to synchronize the optical receiver at the electronic egress edge router 115. The guards at the beginning (preamble) 440 and end (postamble) 445 of a burst 430 help to overcome the uncertainty of burst 430 arrivals and burst duration due to clock drifts between nodes and delay variation in different wavelengths, a mismatch between burst 430 arrival time and slotted optical switching matrix configuration time, and non-deterministic optical matrix configuration times. Other optical layer information (OLI) such as performance monitoring and forward error correction could also be included.

Like the data packet header in the conventional packet-switched network, the burst header packet 220 contains the necessary routing information to be used by optical core routers 110 to route the associated burst payload 215 hop by hop to its destination electronic egress edge router 115. Apart from the conventional data packet header 220 information, the burst header packet also contains optical burst-switching specific information, like burst offset time $\tau$, burst duration, and the data channel carrying the burst payload 215, etc., as mentioned before.

Figure 5:
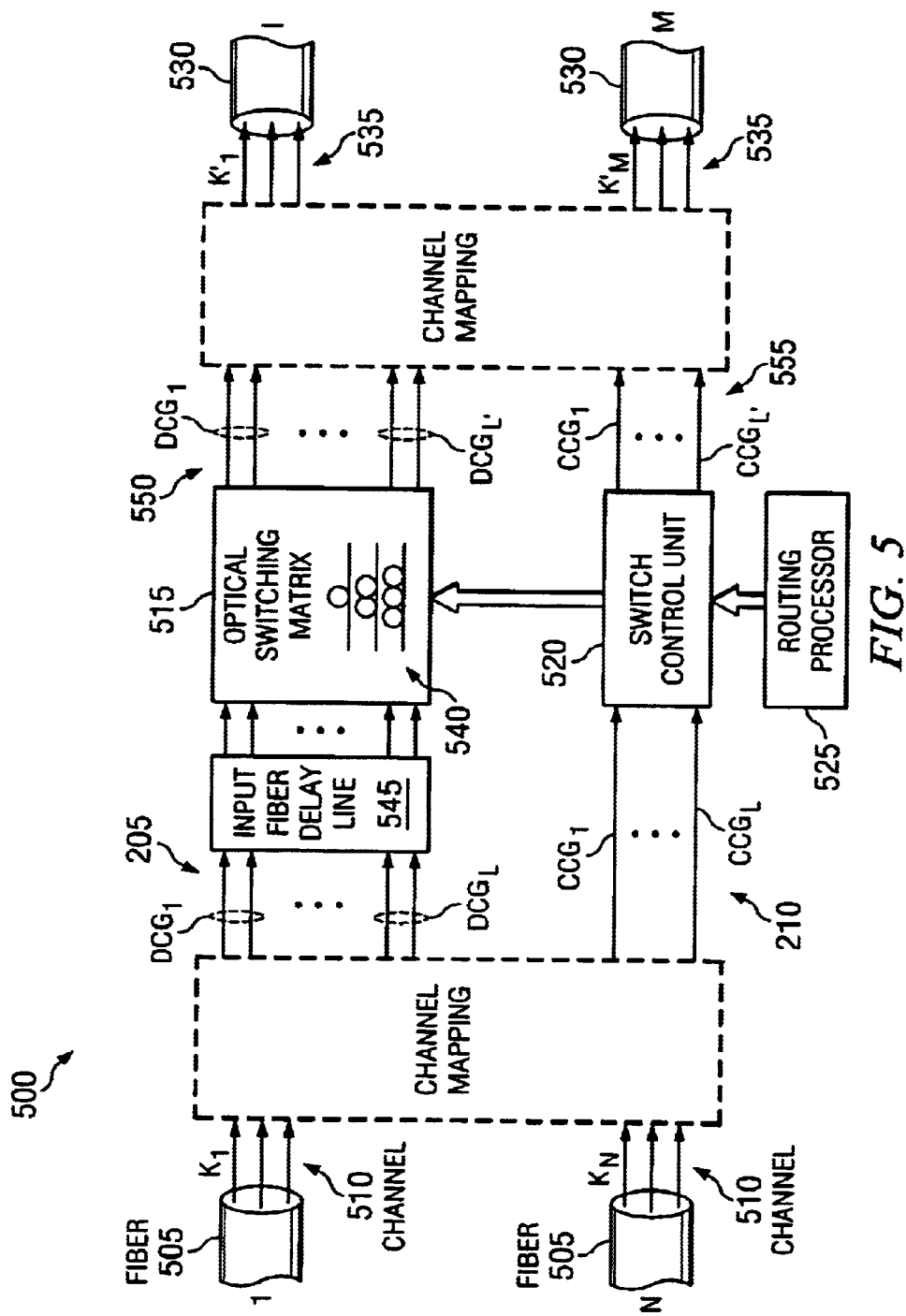
FIG. 5 shows one example of the general architecture of an optical core router according to the present invention.

The general architecture 500 of an optical core router 110 according to the present invention is shown in FIG. 5. The general architecture of the optical core router 110 includes multiple input optical fibers 505, multiple input channels 510 within each input fiber 505, multiple data channel groups 205, multiple control channel groups 210, an input fiber delay line 545, an optical switching matrix 515, a switch control unit 520, a routing processor 525, multiple output optical fibers 530, and multiple output channels 535. There is one data channel group 205 and one control channel group 210 for each direction. The data channel group 205 and the control channel group 210 can be on the same optical fiber 505 or different optical fibers 505. Note that the number of incoming data channel groups 205 is L and the number of outgoing data channel groups 550 is L'.

A burst payload 215 is transmitted into the input fiber delay line (FDL) 545 on a data channel group 205. The input fiber delay line 545 can either be fixed or tunable. A burst header packet 220 is transmitted to the switch control unit 520 on a control channel group 210. The purpose of the input fiber delay line 545 is to delay the burst payload 215 for a period of time before entering the optical switching matrix 515 while the burst header packet 220 is electronically processed in the switch control unit 520. The optical switching matrix 515 is able to switch a burst payload 215 from an inbound data channel 510 to an outbound data channel 535.

Optical buffers 540 within the optical switching matrix 515 are used to resolve burst payload 215 contentions, which could be realized using fiber delay lines 540.

The function of the switch control unit 520 is similar to a conventional electronic router. The switch control unit 520 electronically processes and obtains information from the burst header packet 220 and performs channel mapping functions to logically determine from which inbound optical fiber 505 and from which inbound data channel 510 the burst payload 215 came from. The function of the routing processor 525 is to run routing and other control protocols for the whole optical burst-switched network 100. The routing processor 525 also creates and maintains a forwarding table and forwards that information to the switch control unit 520. The switch control unit 520 then determines on which outgoing data channel group 550 and outgoing control channel group 555 to forward the burst payload 215 and its corresponding burst header packet 220 based on the information from the forwarding table. If there are free outgoing data 550 and control 555 channels available from these groups, either when the burst payload 215 arrives to the optical switching matrix 515 or after some delay in an optical buffer 540, the switch control unit 520 will then select the optical buffer 540 and configure the optical switching matrix 515 to let the burst payload 215 pass through. Otherwise, the burst payload 215 is dropped.

In arranging the transfer of a burst payload 215 and its corresponding burst header packet 220 in the optical switching matrix 515 and switch control unit 520, respectively, the switch control unit 520 tries to "resynchronize" the burst payload 215 and its corresponding burst header packet 220 by keeping the offset time $\tau$ as close as possible to $\tau_0$ as shown earlier in FIG. 3. If a burst payload 215 enters the optical switching matrix 515 before its corresponding burst header packet 220 has been processed (this phenomenon is called early burst arrivals), the burst payload 215 is simply "dropped". This is because burst payloads 215 are optical analog signals. If no path is set up when a burst payload 215 enters the optical switching matrix 515 it is lost. Since a burst header packet 220 and its burst payload 215 are switched in the switch control unit 520 and the optical switching matrix 515 respectively, the delay introduced by the input fiber delay line 545 should be properly designed such that under the normal traffic condition burst payloads 215 are rarely dropped due to early arrivals.

Figure 6:
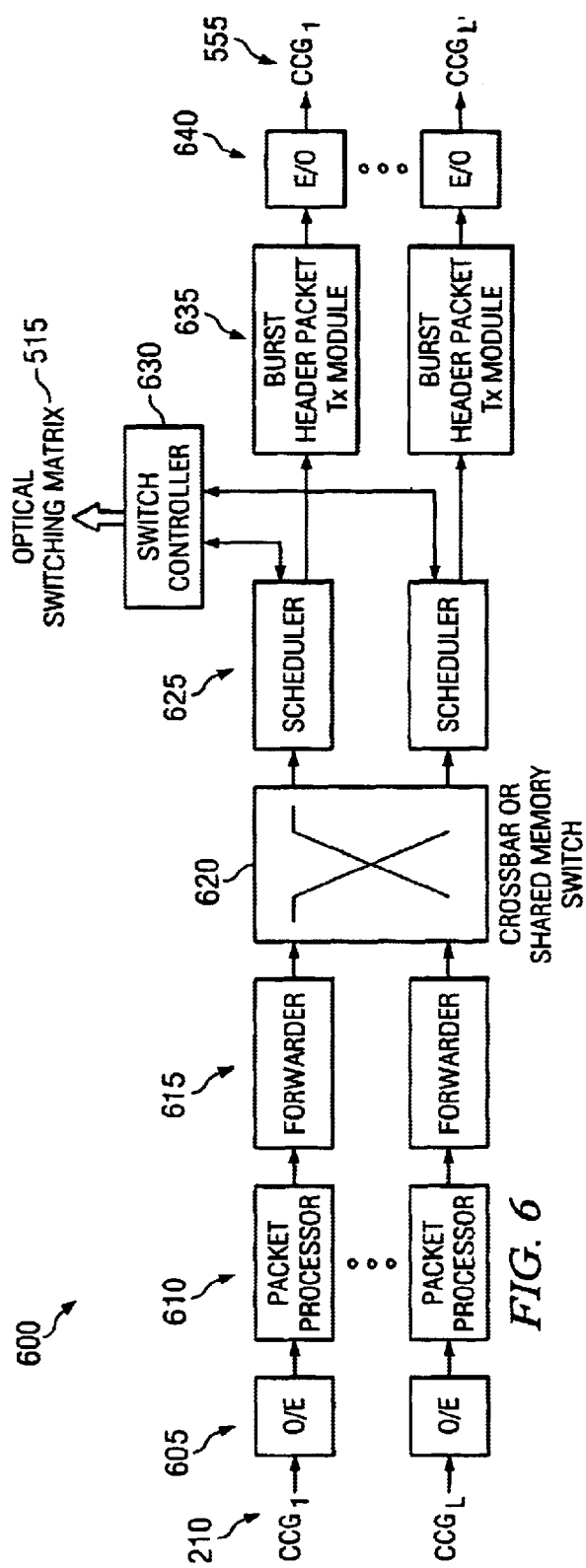
FIG. 6 shows one example of a block diagram of the switch control unit according to the present invention.

FIG. 6 shows one example of a block diagram 600 of the switch control unit 520 according to the present invention. The switch control unit 520 includes multiple optical to electrical (O/E) converters 605, multiple packet processors (PP) 610, multiple forwarders 615, a switch 620 (one example is the cross-bar switch, another example is the shared memory switch), multiple schedulers 625, a switch controller 630, multiple burst header packet transmission (BHP Tx) modules 635, and multiple electrical to optical (E/O) converters 640. The block diagram 600 of the switch control unit 520 can have either a centralized configuration or a distributed configuration depending on the optical switching matrix 515. In a distributed configuration, each scheduler 625 has its own switch controller 630. A distributed configuration could be applied to broadcast-and-select type optical switches. For the purpose of this example, FIG. 6 is an example of a centralized configuration. However, the same design principles can also be applied to the distributed configuration.

When the burst header packet 220 enters the switch control unit 520, it first enters an O/E converter 605 and undergoes an optical to electronic conversion. Next the burst header packet 220 enters the packet processor 610. The packet processor 610 performs layer one (1) and layer two (2) decapsulation functions and attaches a time-stamp to each arriving burst header packet 220. The time-stamp records the arrival time of the associated burst payload 215 to the optical switching matrix 515. The time-stamp is the sum of the burst header packet 220 arrival time, the burst offset-time τ carried by the burst header packet 220 and the delay of the input fiber delay line 545.

Next the time-stamped burst header packet 220 enters the forwarder 615. The forwarder 615 contains a forwarding table and a queue. The forwarder 615 looks up the routing information from the forwarding table and determines which outgoing control channel group 555 the burst header packet 220 should be forwarded to. The associated burst payload 215 will be forwarded to the corresponding outgoing data channel group 550. A routing tag is attached to the burst header packet 220 to be used by the switch 620 to route the burst header packet to the scheduler 625 associated with the destined outgoing control channel group 555. If quality of service (QoS) related information is not completely carried by the burst header packet 220, it will also be attached to the burst header packet 220.

The forwarder 615 then puts the processed burst header packet 220 in the forwarder queue, which is served in a given order. One example is the first-in-first-out (FIFO) order. One function of the forwarder queue is to resolve possible internal contentions in the switch 620. To reduce the switch 620 latency, it is preferable to use the switch 620 with output-queuing performance. To support multicast traffic, the switch 620 requires native multicast capability, otherwise, copies of multicast burst header packets 220 are made in the forwarder 615.

In case that there is a long queue in either the forwarder 615, the scheduler 625, or both, and it is unlikely that the burst header packet 220 will be processed before the burst payload 215 enters the optical switching matrix 515, the forwarder 615 can either discard the burst header packet 220 or push lower priority burst header packets 220 out of the forwarder 615 queue. Priority queues could also be used in the forwarder 615.

Next the burst header packet 220 is switched by the switch 620 and enters the scheduler 625. The scheduler 625 reads the timing information and the burst payload 215 duration information from the corresponding burst header packet 220 to determine when the burst payload 215 will arrive in the optical switching matrix 515 and how long the burst payload 215 will last. The scheduler 625 first searches for an idle outbound data channel to carry the burst payload 215, taking into account also the fiber delay line optical buffer 540. Once the idle outbound data channel is found and the fiber delay line to be used (if necessary) is determined, the scheduler 625 knows when the first bit of the burst payload 215 will leave the optical switching matrix 515. The scheduler 625 then schedules the time to send out the burst header packet 220 on the outgoing control channel group 555, trying to "resynchronize" the burst payload and the burst header packet (i.e., keeping the offset time τ (>=0) as close as possible to $\tau_0$). After successfully scheduling the transfer of burst payload 215 and burst header packet 220 onto outbound data and control channel groups, the scheduler 625 will send the configuration information to the switch controller 630 which will in turn configure the optical switching matrix 515 accordingly to let the burst payload 215 pass through.

The scheduler 625 is bi-directionally connected to the switch controller 630. After processing the configuration information sent by the scheduler 625, the switch controller 630 sends back an acknowledgement to the scheduler 625. The scheduler 625 then updates the burst header packet 220 (e.g., the offset time and the data channel identifier) and passes it along with the time-to-send burst header packet 220 information to the burst header packet transmission module 635. Next the burst header packet 220 enters the BHP Tx module 635. The burst header packet transmission module 635 reads the time-to-send the burst header packet 220 information attached to the burst header packet 220 so it knows when to transmit it. Finally the burst header packet 220 enters the E/O converter 640 and converts the burst header packet 220 back to an optical signal before transmitting the burst header packet 220 to the appropriate outgoing control channel group 555.

Figure 7:
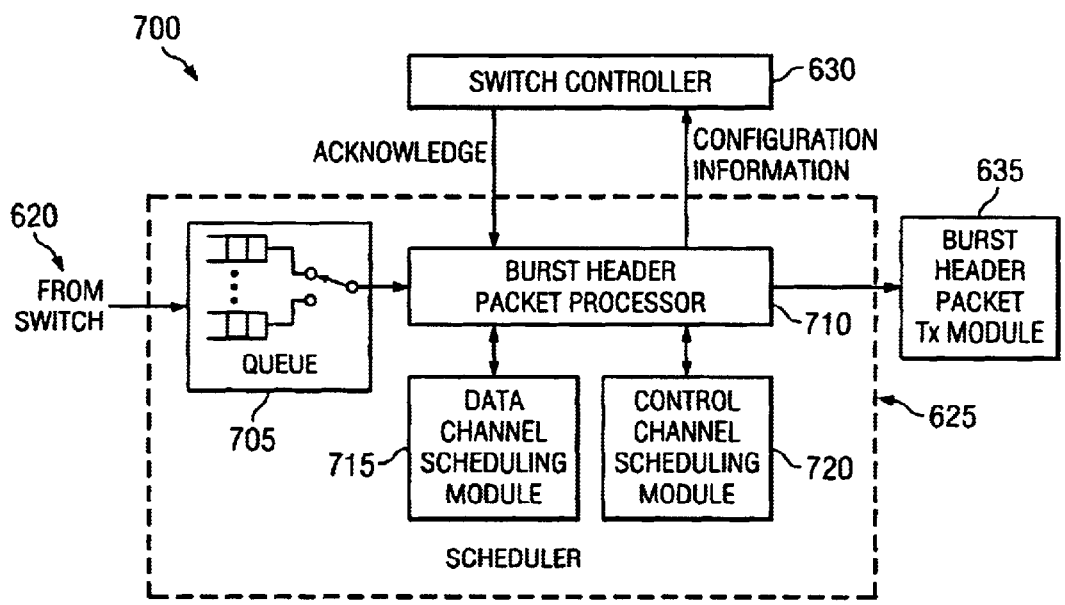
FIG. 7 shows one example of a block diagram of the scheduler according to the present invention.

FIG. 7 shows a block diagram 700 of the scheduler 625 according to the present invention. The scheduler 625 includes a scheduling queue 705, a burst header packet processor 710, a data channel scheduling module 715, and a control channel scheduling module 720. The scheduler 625 is optical switching matrix 515 specific. In a non-blocking optical switching matrix 515 with output queue, an arriving burst payload 215 on an inbound data channel group 205 can be switched to any outbound data channel group 550. A fiber delay line optical buffer 540 is used to resolve burst payload 215 contentions on outbound data channel groups 550 which is assumed to have B fiber delay lines with the $i^{th}$ fiber delay line introducing $Q_i$ delay time, $1 \leq i \leq B$. Without loss of generality, we assume that $Q_i = i \cdot D$ where D is a given time unit. By default there is always a fiber delay line with zero delay time, denoted by 0 with $Q_0 = 0$. For a non-blocking optical switch matrix 515 with output queuing, each scheduler 625 need only to keep track of the busy/idle periods of its associated outgoing data channel group 550 and outgoing control channel group 555.

Burst header packets 220 arriving from the switch 620 are first stored in the scheduling queue 705. For basic operation, all that is required is one scheduling queue 705, however, virtual scheduling queues may be maintained for different service classes such as priority. For purposes of this example, only one scheduling queue 705 will be discussed.

After selecting a burst header packet 220 from the scheduling queue 705, the burst header packet processor 710 extracts the burst header packet 220 timing information and the burst payload 215 duration among others. The burst header packet 220 timing information contains the burst payload 215 arrival time to the optical switching matrix 515. The burst header packet processor 710 then triggers the data channel scheduling (DCS) module 715 and the control channel scheduling (CCS) module 720 in sequence. The burst header packet processor 710 first transmits the timing information and the burst payload 215 duration information to the data channel scheduling module 715. The data channel scheduling module 715 searches for an idle outgoing data channel where the burst payload 215 can be transmitted. If an idle data channel is available, either when the burst payload 215 enters the optical switching matrix 515 or after some delay in the fiber delay line optical buffer 540, the data channel scheduling module 715 knows the time when the first bit of the burst payload 215 will leave the optical switching matrix 515. It then transmits the burst payload 215 time-to-leave information and the information on which fiber delay line buffer to use back to the burst header packet 710 processor. The burst header packet processor 710 then transmits the time-to-leave information to the control channel scheduling module 720. Based on the time-to-leave information, the control channel scheduling module 720 will select the time to send the burst header packet 220 on the outbound control channel group 555 based on the principle of keeping the offset time τ as close as possible to $\tau_0$. Next, the burst header packet processor 710 instructs the switch controller 630 to configure the optical switching matrix 515 accordingly. The configuration information sent from the burst header packet processor 710 to the switch controller 630 includes an incoming data channel identifier, an outgoing data channel identifier, a time to switch the burst payload 215, the burst payload 215 duration, and a fiber delay line identifier.

After receiving an acknowledgement from the switch controller 630, the burst header packet processor 710 updates the burst header packet 220 (e.g., the burst offset-time τ, the data channel identifier, among others) and passes it along with the time-to-send burst header packet 220 information to the burst header packet transmission controller module 635. The burst header packet processor 710 is then ready to process the next burst header packet 220.

In the case where the required delay time for the burst payload 215 is too long (e.g. >B·D, the longest delay provided by the fiber delay line buffer) or the burst header packet 220 cannot be sent on the outbound control channel group 555 or there is not enough time to process the burst header packet 220 before the burst payload 215 enters the optical switching matrix 515, the burst payload 215 and its corresponding burst header packet 220 are simply discarded.

Figure 8:
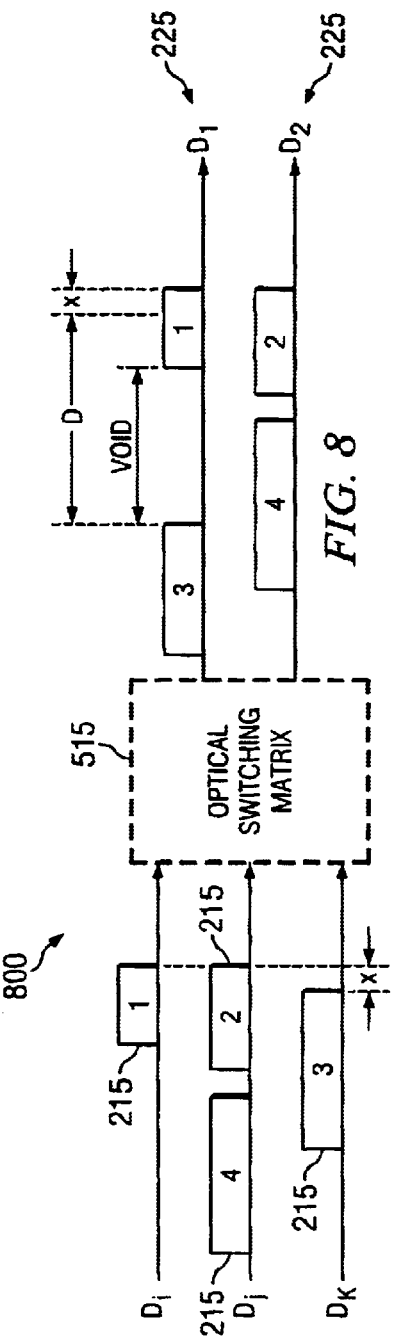
FIG. 8 shows and illustration of a void/gap created by the fiber delay line buffer.

The data channel scheduling module 715 runs a scheduling algorithm for data channels groups 205. The scheduling algorithm is an important part of the switch control unit design and is also very complex due to voids/gaps introduced by the fiber delay line buffers 540 as illustrated by the block diagram 800 in FIG. 8. In FIG. 8, four arriving burst payloads 215 are destined to the same outgoing data channel group 550 of $D_1$ and $D_2$. The scheduling algorithm called Latest Available Unused Channel with Void Filling (LAUC-VF) is used to handle the scheduling.

The basic idea of the LAUC-VF algorithm is to minimize voids/gaps by selecting the latest available unused or unscheduled data channel for each arriving burst payload 215. Given the arrival time t of a burst payload 215 with duration L to the optical switching matrix 515, the scheduler 625 first finds the outgoing data channels that are available for the time period of (t,t+L). If there is at least one such data channel, the scheduler 625 selects the latest available data channel, i.e., the channel 225 having the smallest gap between t and the end of last burst payload 215 just before t.

Figure 9:
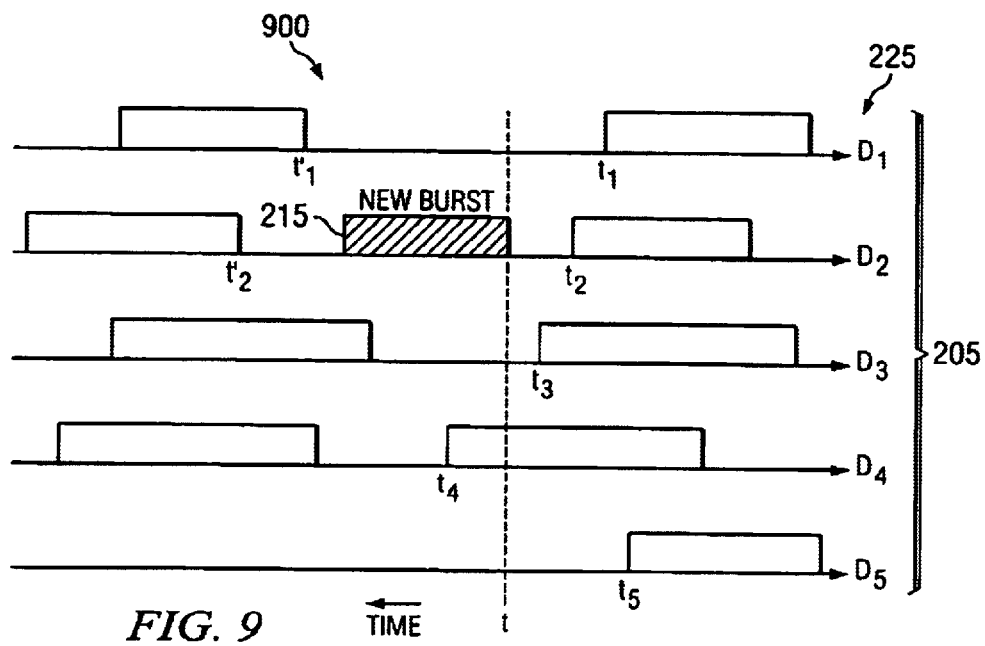
FIG. 9 shows an illustration of the Latest Available Unused Channel with Void Filling (LAUC-VF) algorithm.

FIG. 9 shows an illustration 900 of the LAUC-VF algorithm. In FIG. 9, the data channel group 205 has 5 data channels where $D_1$, $D_2$ and $D_5$ are eligible unused data channels at t for carrying said burst payload 215. However, data channels $D_3$ and $D_4$ are ineligible at t because the void is too small on $D_3$ for the burst payload 215 and $D_4$ is busy at t. Data channel $D_2$ is chosen to carry the burst payload 215 as $t-t_2<t-t_1<t-t_5$. If all the data channels are ineligible at time t, the scheduler 625 will then try to find the outgoing data channels that are eligible at time t+D (i.e. available for the time period of (t+D, t+D+L), and so on so forth. If no data channels are found eligible up to time t+B·D (i.e., for the time period of (t+B·D,t+B·D+L)), the arriving burst payload 215 and the corresponding burst header packet 220 are dropped. Note that B·D constitutes the longest time the burst payload 215 can be buffered (delayed).

The formal description of the LAUC-VF algorithm is presented below. Suppose a burst payload with duration L arrives to the optical switching matrix at time t. Assume the first bit of the burst payload will also leave the optical switching matrix at time t (i.e., start to use an outgoing data channel at time t) if no fiber delay line buffer is used. Here the time spent by the burst payload to cross the optical switching matrix is neglected for the purpose of simplifying the description. Suppose the optical router has an optical buffer of B fiber delay lines with $i^{th}$ fiber delay line being able to delay $Q_i$ time. Let LAUC-VF(t) be a process which searches for the eligible latest available unused channel with void filling at t and returns the selected outgoing data channel to carry the burst payload at time t if found, otherwise return symbol "NO". By default there is always a fiber delay line with zero delay time, denoted by 0 with $Q_0=0$.

```
Begin {LAUC-VF algorithm}
    Step (1) :   i = 0; time-to-leave = t;
    Step (2) :   if (LAUC-VF(time-to-leave) = NO)
                     goto Step (3);
                 else
                     {report selected data channel;
                     report the selected fiber delay line i;
                     stop; }
    Step (3) :   i = i+1;
    Step (4) :   if (i > B)
                     {report failure in finding an
    outgoing data channel and stop}
                 else
                     {time-to-leave = t + Q_i, goto Step (2) ; }
End {LAUC-VF algorithm}
```

Note that in the LAUC-VF algorithm, $Q_i$ is not further specified, $1 \leq i \leq B$. One example is $Q_1<Q_2< \ldots <Q_B$. Another example is $Q_i=i\cdot D$ where D is a delay time unit.

The above is one embodiment of the LAUC-VF scheduling algorithm called exhaustive search, i.e., considering all possible delay times provided by the fiber delay line buffer (starting from $Q_1$ to $Q_B$) when necessary in searching for an available outgoing data channel. Another embodiment of the LAUC-VF scheduling algorithm is called limited search, which only use a subset of all fiber delay lines $(Q_1, Q_2, \ldots, Q_B)$ when searching for an available outgoing data channel.

For a given time t, the data channels can be classified into unscheduled channels where no burst payloads 215 are scheduled after t (e.g. $D_5$) and scheduled channels in which burst payloads 215 are already scheduled after t (e.g. $D_1$, $D_2$, $D_3$ and $D_4$). The LAUC-VF algorithm does not distinguish between scheduled and unscheduled data channels. A variation of the LAUC-VF algorithm would be where the data channels are searched in the order of scheduled and unscheduled channels in LAUC-VF. In a second variation of the LAUC-VF algorithm data channels can be searched in the order of scheduled and unscheduled channels. For eligible scheduled channels, the channel with the minimum gap is chosen (e.g., the selected channel in this case is $D_1$ in FIG. 9 if $t_1'-t_1<t_2'-t_2$). LAUC principles would still apply for the eligible unscheduled channels.

In a third variation of the LAUC-VF algorithm data channels can still be searched in the order of scheduled and unscheduled channels. The first eligible scheduled channel found is chosen to carry the burst payload 215. If all scheduled channels are ineligible, then the first eligible unscheduled channel found is chosen to carry the burst payload 215. The round-robin could be used for each type of channels. Finally, in a fourth variation the data channels can be searched in an order that is either fixed or round-robin. The first eligible channel found is chosen to carry the burst payload 215. In FIG. 9 the channel selected under this algorithm would be $D_1$. After the data channel scheduling module 715 receives an acknowledgement from the burst header packet processor 710, it updates the memory which stores the busy/idle information about the data channel.

Figure 10:
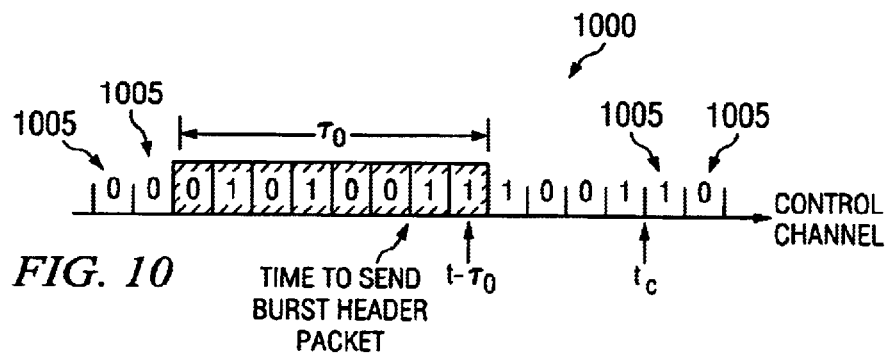
FIG. 10 shows an illustration of the control channel scheduling algorithm according to the present invention.

FIG. 10 shows an illustration 1000 of the control channel scheduling algorithm 1000 according to the present invention. Once the control channel scheduling module 720 receives the burst payload 215 time-to-leave information, say at t, the control channel scheduling module 720 starts to schedule the burst header packet 220 on the control channel group 210. Ideally, the burst header packet 220 should be sent out at time $t-\tau_0$. To facilitate this implementation, control channels are slotted in time, however continuous time could be used as well. One slot 1005 could represent the time interval to transmit one burst header packet 220 or a fraction of a burst header packet 220. For the purpose of this example, assume that one slot 1005 is the time interval to transmit exactly one burst header packet 220.

In FIG. 10, $t_c$ is the starting time of the current time slot 1005, zero (0) means that there is no burst header packet 220 to send, and one (1) means there is a burst header packet 220 to send in a given time slot 1005. The earliest time slot 1005 to transmit the burst header packet 220 is given by $(p_s+\lceil(t-\tau_0-t_c)/L_h\rceil)$ mod $W_c$, where $L_h$ is the time slot 1005 length (i.e., a burst header packet 220 duration), $p_s$ is the pointer to the current control channel transmission time slot 1005, $W_c(=\lceil(\Delta+\tau_0+B\cdot D-\delta)/L_h\rceil)$ is the scheduling window size in time slots 1005, $\lceil x \rceil$ is the smallest integer no less than real value x, and $\delta$ is the fixed delay from the O/E converter 605 to the scheduler 625. If this time slot 1005 is not available, then the burst header packet 220 has to be delayed until a free time slot 1005 is found within the time period of $\tau_0$. Note that parallel comparison is used to quickly determine the earliest transmission time of the burst header packet 220. After reporting the time-to-send burst header packet information to the burst header packet processor 710 and getting an acknowledgment from it, the control channel scheduling module 720 updates the table which stores the activity information about the control channel, by tagging the time slot 1005 as used.

If no free time slot 1005 is found in the time period of $\tau_0$, a negative response will be sent to the burst header packet processor 710. At this point, two options are available for the burst header packet processor 710. The first option is that the burst header packet 220 and its burst payload 215 are simply dropped. The second option is that the burst header packet processor 710 treats the burst header packet 220 as a new one but instructs the data channel scheduling module 715 to find another burst payload time-to-leave. This new time-to-leave should be later than the one previously found. The second option imposes more processing requirements on a data channel scheduling module 715.

FIG. 10 shows one example of the control channel scheduling for the control channel group 210 that is time-slotted. It can be extended to the control channel group 210 that is not time-slotted. In the later case, the control channel scheduling module 720 needs to keep track of the busy/idle periods of its associated control channel group 210. In the eligible time period from $t-\tau_0$ to t, the control channel scheduling module 720 finds the earliest possible time (ideally at $t-\tau_0$ if the control channel is available) to send out the burst header packet 220.

In the case where the control channel group 210 has more than one channel, the above principle still applies for both time-slotted and non-time-slotted control channel groups 210, i.e., finding the earliest possible time (ideally at $t-\tau_0$ if a control channel is available) to send out the burst header packet 220.

Figure 11:
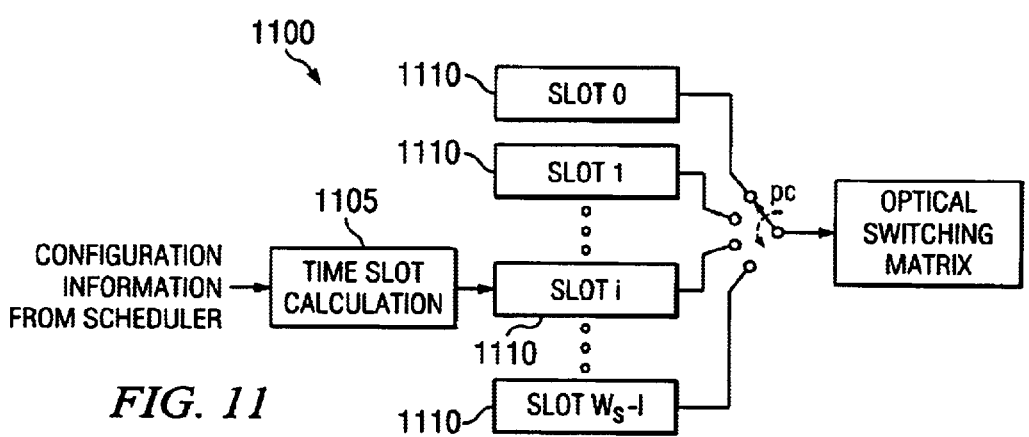
FIG. 11 shows a block diagram of the switch controller according to the present invention.

FIG. 11 shows a block diagram 1100 of the switch controller 630 according to the present invention. The switch controller 630 configures the optical switching matrix 515 in a time slotted fashion. The basic functions of the switch controller 630 are to receive configuration information from the scheduler 625, calculate the time slot 1110 to configure the optical switch matrix 515, and update the configuration information in a table/memory (not shown in FIG. 11) associated with that time slot 1110.

Information on how to configure the optical switch matrix 515 first enters the time slot calculation processor 1105 of the switch controller 630 from the scheduler 625. The information from the burst header packet processor 710 may include information such as which fiber and channel the burst payload 215 came in on, which fiber and channel the burst payload 215 will leave on, when to switch the burst payload 215, and how long the burst payload 215 will last. The time slot calculation processor 1105 uses the following formula to calculate the appropriate time slot 1110 to configure the optical switching matrix: time slot=$(p_c+\lceil(t_s-t_c)/\sigma\rceil)$ mod $W_s$, where $t_s$ is the time to switch, $t^c$ is the starting time of the current configuration time slot, $\sigma$ is the time slot unit and PC is the pointer to the current configuration time slot 1110.

The time slot calculation processor 1105 converts the configuration information into a format that the switch controller 630 understands and stores it in a table/memory associated with the time slot just calculated. The time slot calculation processor 1105 then sends an acknowledgment back to the scheduler 625. The configuration scheduling window $W_s$ is given by $W_s=\lceil(\Delta+\tau_0+B\cdot D-\delta)/\sigma\rceil$. Each table/memory associated with a time slot 1110 in FIG. 11 contains directly or indirectly the information about the gates in the optical switch matrix 5215 to be switched (on or off) in that time slot 1110. The configuration of the optical switching matrix 515 specified in a table/memory is accomplished in one time slot 1110.

Figure 12:
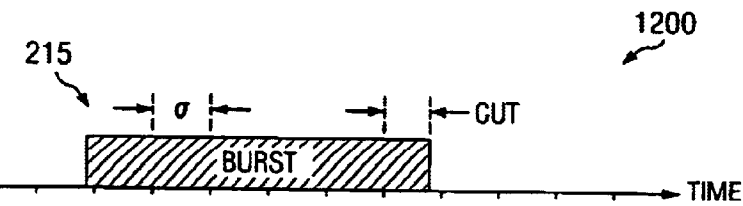
FIG. 12 illustrates the actual time to switch a burst payload and the actual time to configure a burst payload according to the present invention.

Note that the optical switching matrix 515 configuration time calculated above for a burst payload 215 is not necessarily equal to the time-to-switch the burst payload 215 from the scheduler 625. A small portion at the beginning of the burst payload 215 could be cut as depicted 1200 in FIG. 12. However, the real data will not be cut if the guard-B 440 shown in FIG. 4 is larger than $\sigma$. The new burst offset time is calculated using the time-to-leave information, not the actual matrix configuration time, so the guard of the burst payload 215 at next hop is still guard-B 440.

Figure 13:
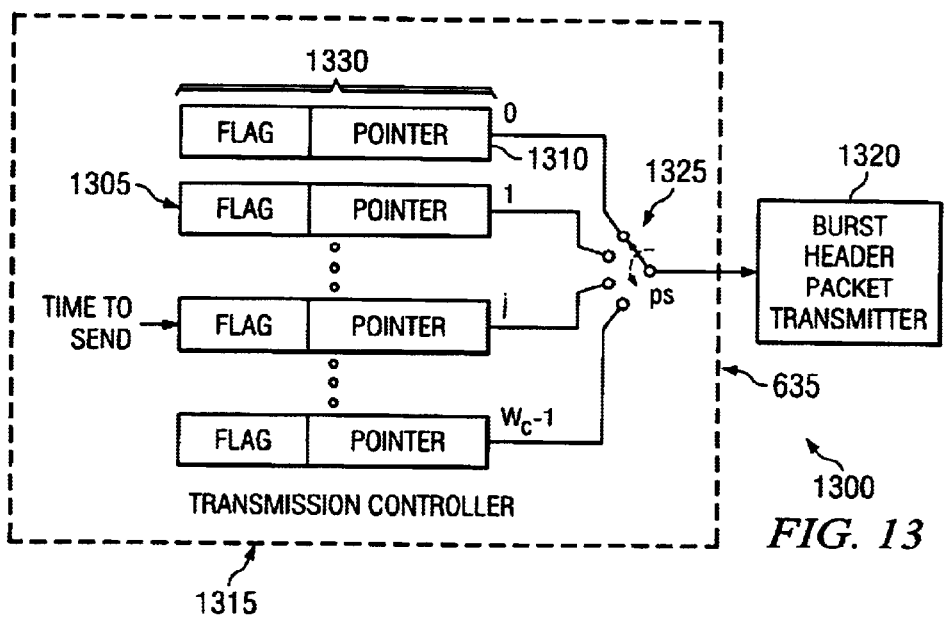
FIG. 13 shows an illustration of the cyclic operation of the burst header packet transmission module according to the present invention.

FIG. 13 shows an illustration 1300 of the cyclic operation of the burst header packet transmission module 635. The burst header packet transmission module 635 consists of transmission controller 13215 and a burst header packet transmitter 1320. The transmission controller 1315 consists of multiple time slots 1330 and a time slot pointer 1325. Each time slot 1330 contains a flag bit 1305 and a pointer 1310. The function of the transmission controller 13215 is to manage the transmission of burst header packets 220 according to their time-to-send information calculated by the scheduler 625. The flag bit 1305 indicates whether there is a burst header packet 220 in a given time slot 1330 to be sent to the burst header packet transmitter 1320. A flag bit 1305 of '1' means that there is a burst header packet 220 to be sent. There can be more than one burst header packet 220 per time slot 1330 if each burst header packet 220 in that time slot 1330 is going to different control channels. The pointer 1310 points to an address of burst header packet 220 if the associated flag bit 1305 is '1'. The burst header packet transmitter 1320 performs layer two (2) and layer one (1) encapsulation functions and transmit the burst header packet.

Figure 14:
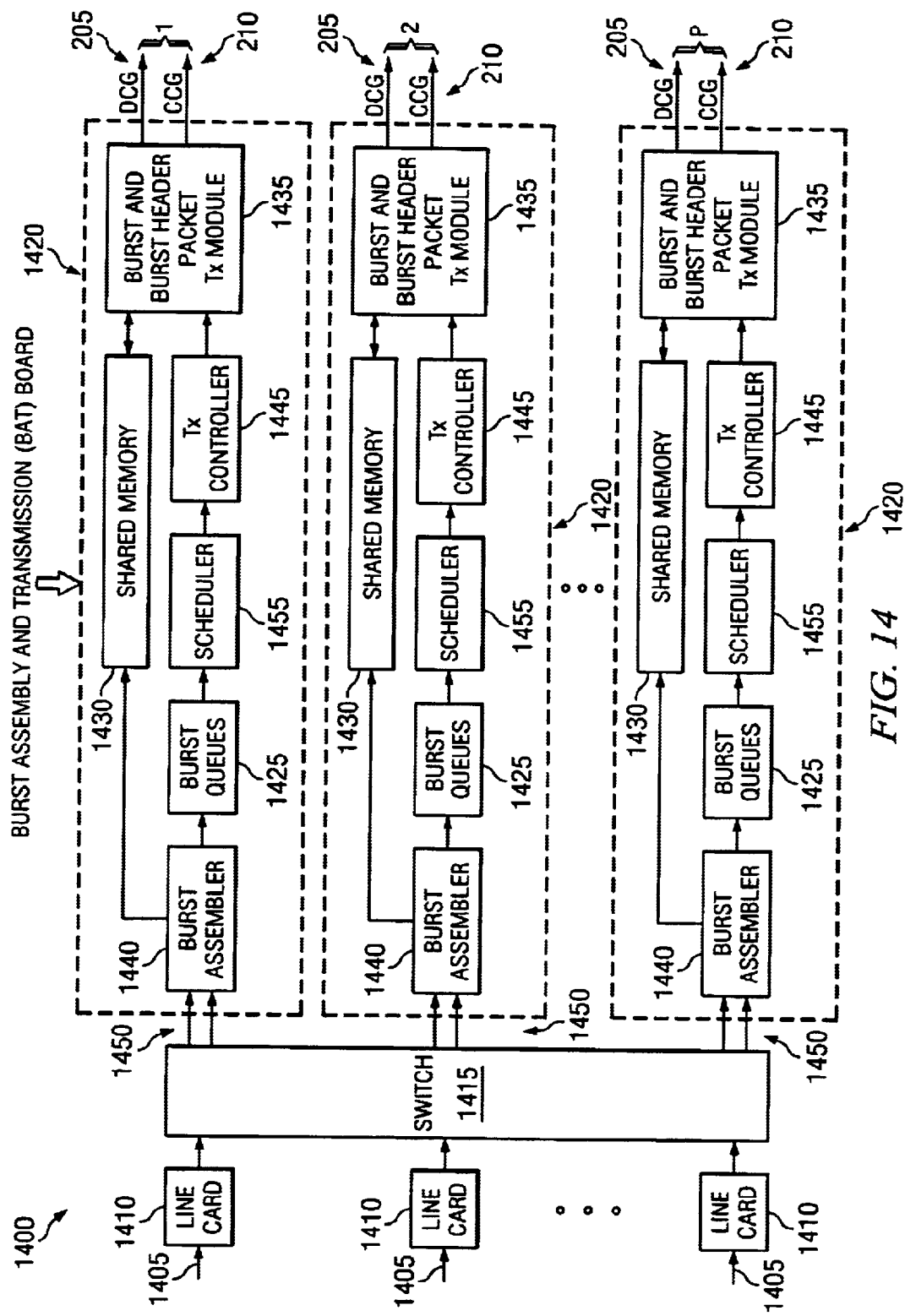
FIG. 14 shows a diagram of one example of the functional architecture of an electronic ingress edge router according to the present invention.
Figure 15:
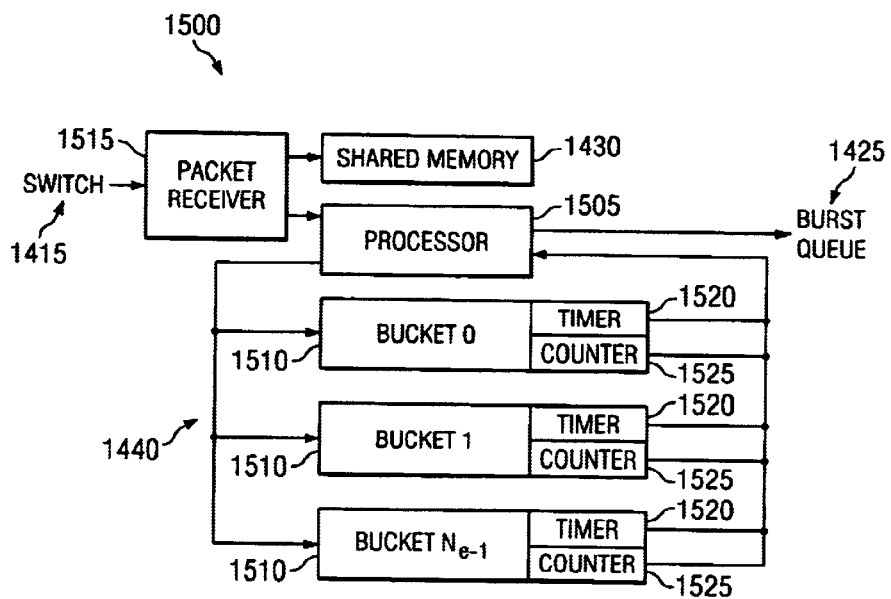
FIG. 15 shows one example of a burst assembler according to the present invention.

FIG. 14 shows a diagram 1400 of one example of the functional architecture of an electronic ingress edge router 105 according to the present invention. The architecture 1400 of the electronic ingress edge router 105 includes multiple fibers 1405, multiple line cards 1410, a switch 1415, and multiple burst assembly and transmission (BAT) boards 1420. Each BAT board 1420 includes a burst assembler 1440, a burst queue 1425, a shared memory 1430, multiple electronic links 1450, a scheduler 1455, a transmission controller 1445, and a burst payload and burst header packet transmission module 1435. The main function of the electronic ingress edge router 105 is to assemble data packets 405 into bursts 430 and forward them to the optical burst-switched network 100 according to the optical burst switching protocol.

Data packets 405 first enter into the line cards 1410 through fibers 1405. The line cards 1410 and switching fabric are from conventional electronic routers. The line cards 1410 perform layer one (1) and layer two (2) de-capsulation functions, routing table lookup, traffic classification, policing/shaping, and forwards data packets 405 to the switch 1415. An additional function of the line card 1410 is to attach an electronic egress edge router address to a data packet 405 which will be used later in burst assembly. The switch 1415 receives the data packets 405 from the line cards 1410 and forwards the data packets 405 to the burst assembler 1440 in the proper BAT board 1420 through the multiple electronic links 1450.

FIG. 215 shows one example 1500 of a burst assembler 1440 according to the present invention. The burst assembler 1440 includes a packet receiver 1515, a processor 1505, and multiple buckets 1510. Each bucket 1510 includes a timer 1520 and a counter 1525. The purpose of the burst assembler 1440 is to assemble data packets 405 into bursts according to their electronic egress edge router addresses and quality of service requirements. For multicast traffic, burstification is performed based on multicast group addresses. For the purpose of this example only unicast traffic and egress edge router addresses are considered.

A data packet 405 made up of a data packet payload and a data packet header enters the packet receiver 1515 from the switch 1415. The data packet 405 is then transmitted to and stored in the shared memory 1430. The data packet header is also transmitted to the processor 1505. The processor 1505 reads the destination information (electronic egress edge router 1215 address) from the data packet header to determine which bucket 1510 this data packet should be associated with. Based on the destination information obtained from the data packet header, the processor 1505 puts the shared memory address where the corresponding data packet 405 is stored into the appropriate bucket 1510.

The timer 1520 records the elapsed time since the first data packet 405 arrives in the bucket 1510. When the timer 1520 exceeds the predetermined burst 430 assembly time a burst is assembled. The timer 1520 then feeds the information back to the processor 1505 and tells the processor 1505 to transmit the burst 430 to the burst queue 1425. The counter 1525 records the number of bytes accumulated in the bucket 1510. When the counter 1525 exceeds the maximum burst length $L_{max}$ (in bytes), a burst 430 is assembled. The counter 1525 then feeds this information back to the processor 1505 and tells the processor 1505 to transmit the burst 430 to the burst queue 1425. Once the burst 430 is assembled, the assembled burst 430 is stored in the shared memory 1430 of the BAT board 1420, and a burst header packet 220 together with the burst location in the shared memory 1430 are passed to the burst queue 1425.

Following is an example of an algorithm which the burst assembler 1440 may use in assembling data packets 405 into bursts 430. Suppose the burst assembly time of bucket 1510 i is $T_a(i)$, $0 \leq i \leq N_e - 1$, where $N_e$ is the number of electronic egress edge routers 115. Let the timer 1520 of bucket 1510i be denoted by $T_c(i)$ and the burst length (in bytes) in the bucket 1510 i by $l_b(i)$. The basic idea is to start counting the time when there is a data packet 405 arrival to an empty bucket 1510, and when either the elapsed time equals $T_a(i)$ or the number of bytes in the bucket reaches $L_{max}$ bytes, a burst 430 is assembled with length $l_b(i)$ and $l_b(i)$ is then reset to zero. The detailed procedure is given below.

---

(1) When a packet with length of x bytes arrives to bucket i:
If ($l_b(i)=0$)
{ $T_c(i)=0$; $l_b(i)=x$; }
else if ($l_b(i)+x < L_{max}$)
$l_b(i) = lb(i)+x$;
else
{ report the arrival of a burst 430 with length $l_b(i)$;
$T_c(i)=0$; $l_b(i)=x$; }
(2) When $T_c(i) = T_a(i)$
{ report the arrival of a burst 430 with length $l_b(i)$;
$l_b(i)=0$; }.

---

Figure 16:
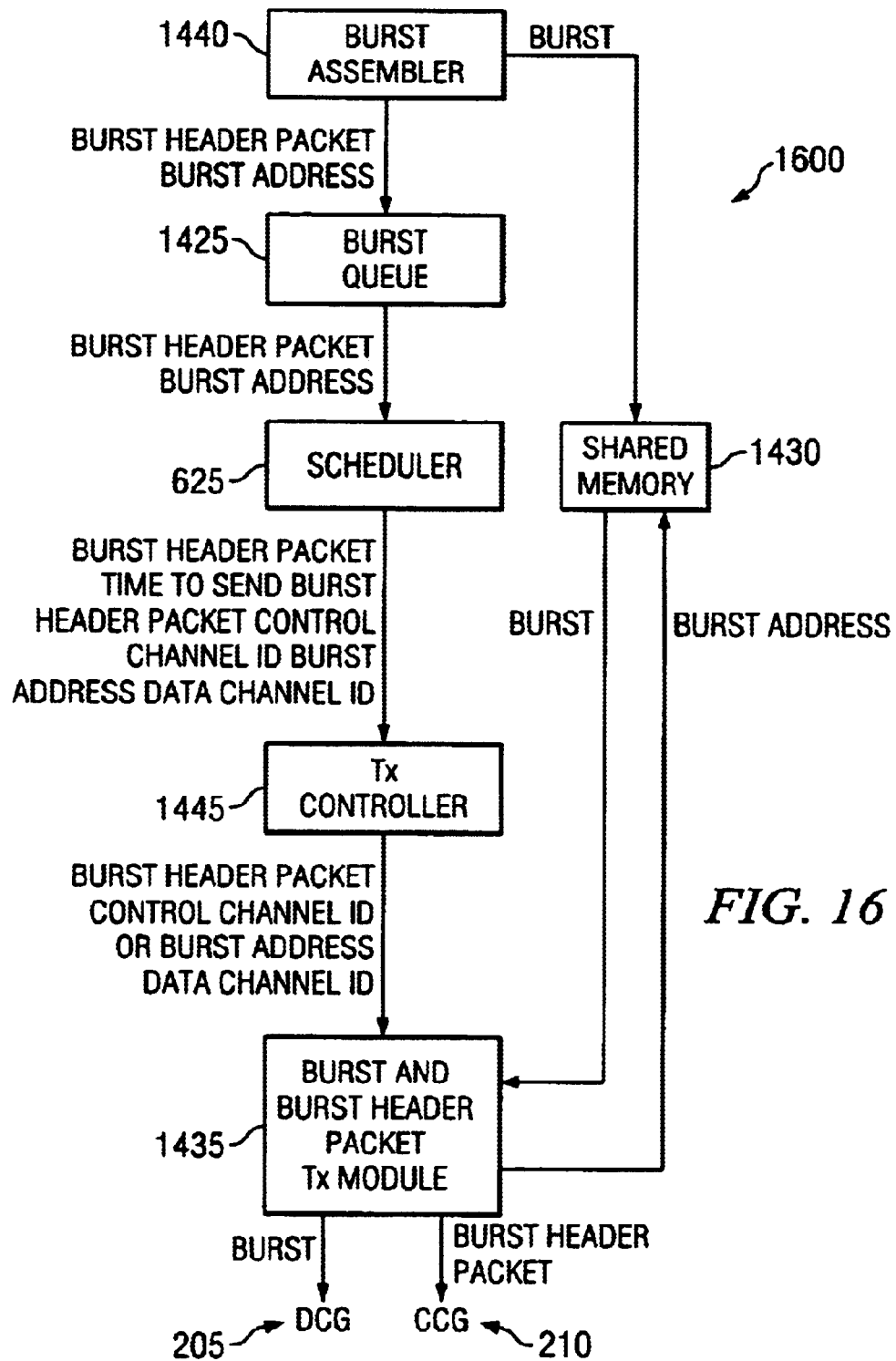
FIG. 16 shows a diagram depicting one example of the information exchanges between blocks in a burst assembly and transmission (BAT) board according to the present invention.

FIG. 16 shows a diagram depicting one example 1600 of the information exchanges between blocks in a BAT board 1420 according to the present invention. After a burst 430 is assembled in the burst assembler 1440, the burst header packet 220 and the burst address in the shared memory are transmitted to the burst queue 1425. The burst queue 1425 acts as a buffer. Next the burst header packet 220 and the burst address are transmitted to the scheduler 1455. The scheduler 1455 in FIG. 14 serves the burst queue 1425 according to burst type and QoS requirements. The scheduler 1455 keeps track of the unscheduled time (i.e. the future available time) for each data channel. The scheduler 1455 also keeps track of the unscheduled time or time slot (if slotted operation is used) for each control channel. For the purpose of this example, only time slotted control channels will be discussed.

For a burst 430, the scheduler 1455 first finds the data and control channels with the latest available unscheduled time and time slot, respectively. The scheduler then determines the earliest time slot and time to send the burst header packet 220 and the burst payload 215 on the control and data channels. There is an offset time, say To, between the burst header packet 220 and its corresponding burst payload 215. Afterwards, the scheduler 1455 modifies the burst header packet 220 and passes it along with the burst address, the transmission times, and channels to the transmission controller 1445. The scheduler 1455 then updates its record on the unscheduled times of the data and control channels.

The transmission controller 1445 functions similar to the transmission controller 13215 in FIG. 13, except now it also remembers the transmission time of each burst 430 and trigger the corresponding burst transmitter within the burst and burst header packet transmission module 1435. The transmission controller 1445 transmits the burst header packet 220 and a control channel ID to the burst and BHP transmission module 1435 when it is time to transmit the burst header packet 220. The transmission controller 1445 also transmits the burst address and a data channel ID to the burst and BHP transmission module 1435 when it is time to transmit the burst 430.

Figure 17:
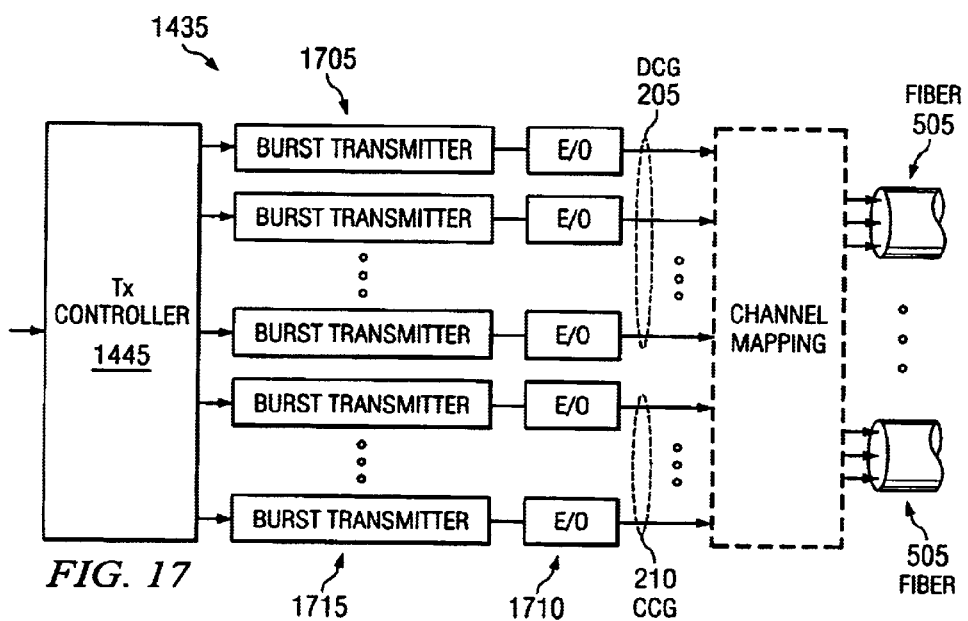
FIG. 17 shows one example of a burst and burst header packet transmission module according to the present invention.

The burst and burst header packet transmission module 1435 according to the present invention is shown in FIG. 17.

The burst header packet 220 and the control channel ID are received at a burst header packet transmitter 1715. Similarly, the burst address and the data channel ID are received at the burst transmitter 1705. Once the burst header packet transmitter 17215 receives the burst header packet 220 and the control channel ID, it performs layer two (2) and layer one (1) encapsulation functions and transmits the burst header packet 220. An E/O conversion 1710 to a pre-specified wavelength/channel is performed on the burst header packet 220 after each burst header packet transmitter 1715. Once the burst transmitter receives the burst address and the data channel ID, it uses the burst address to retrieve the burst 430 from the shared memory 1430 and generate a burst payload 215 An E/O conversion 1710 to a pre-specified wavelength/channel is performed on the burst payload 215 after each burst transmitter 1705 and DWDM multiplexers are then used to multiplex channels onto fibers 505. Channel mapping is used to logically decouple the channels 225 from physical fibers in case the data channel group 205 and the control channel group 210 are carried on more than one fiber 505.

Figure 18:
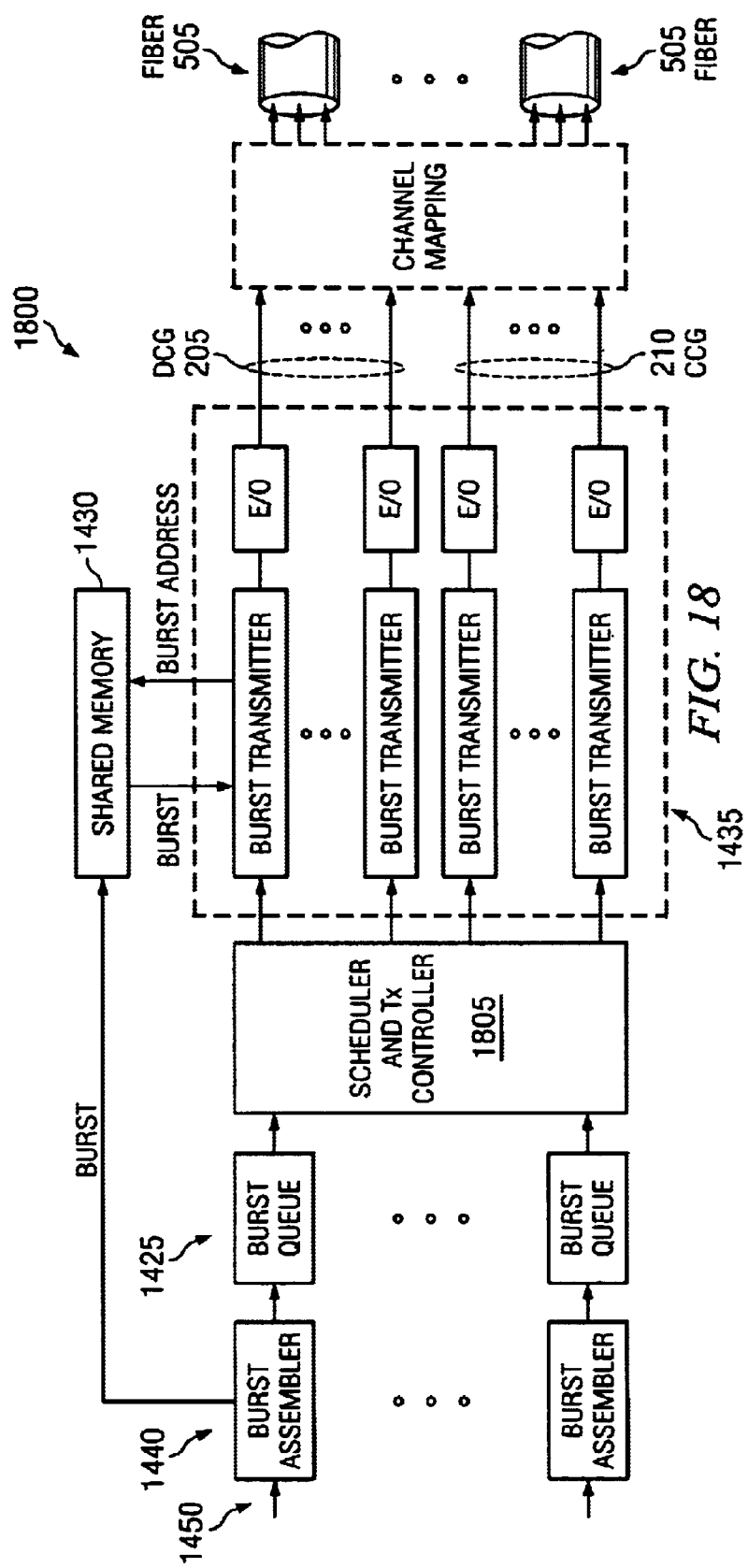
FIG. 18 shows an example of an alternative design for the burst assembly and transmission board according to the present invention.
Figure 19:
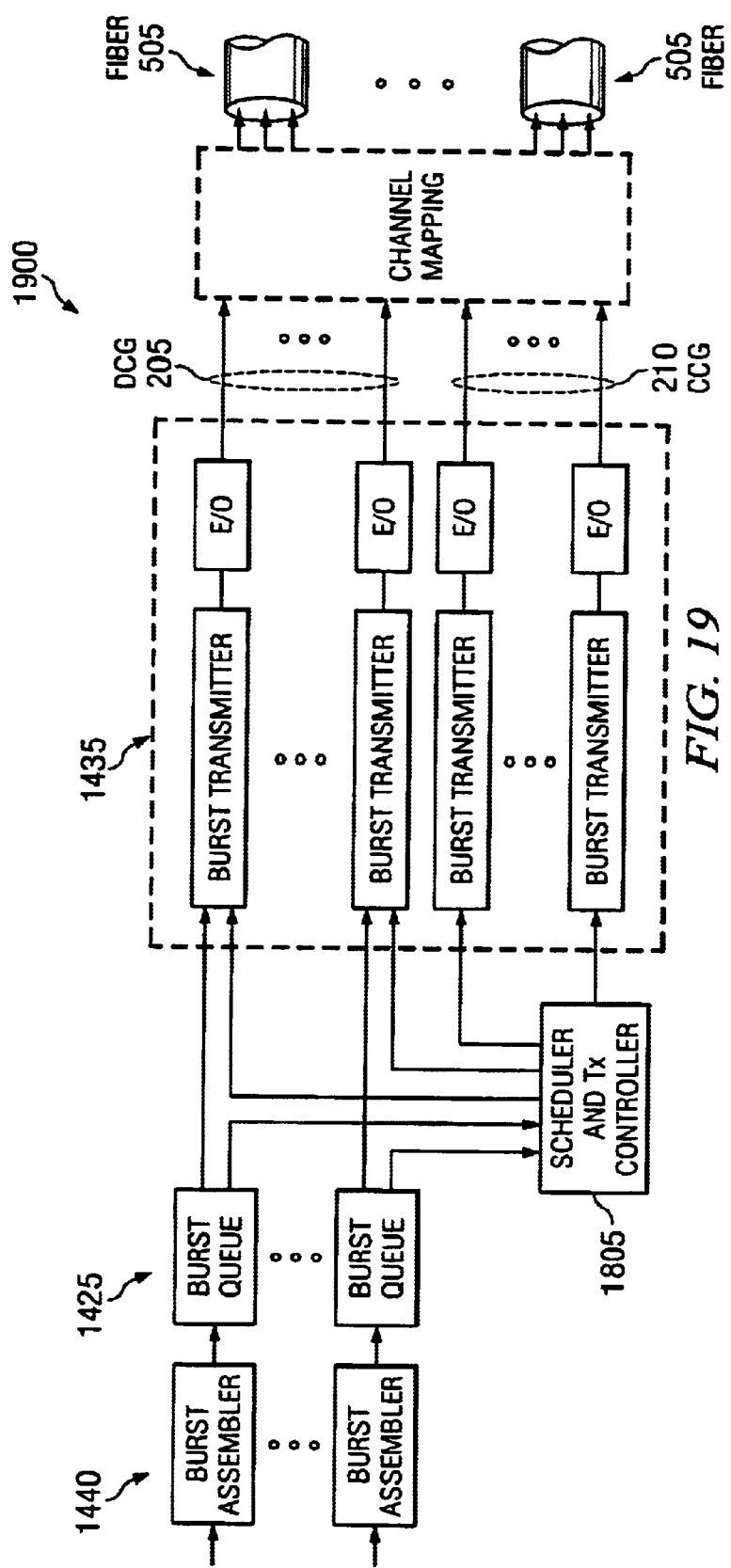
FIG. 19 shows a second example of an alternative design for the burst assembly and transmission board according to the present invention.

The bit rate entering a BAT board 1420 in FIG. is likely to be at tens of gigabits per second. The burst assembler 1440 has to work extremely fast. To reduce the burden of burst assembly at such high speed, FIG. 18 and FIG. 19 show two alternative designs for the BAT board 1420. Load balancing is now required in the switch 14215 of FIG. 14 when forwarding data packets 405 to the burst assemblers 1440 on the same BAT board 1420.

FIG. 18 shows a first alternative design 1800 for the burst assembly and transmission (BAT) board 1420 according to the present invention. The first alternative design 1800 for the BAT board 1420 includes multiple burst assemblers 1440, multiple electronic links 1450, multiple burst queues 1425, a combined scheduler and transmission controller 1805, a burst and BHP transmission module 1435, and multiple fibers 505. The BAT board 1800 shown in FIG. 18 has a burst assembler 1440 for every electronic link 1450, one burst queue 1425 for every electronic link 1450, and a combined scheduler/transmission controller 1805. The BAT board 1420 shown in FIG. 14 has just one burst assembler 1440 for multiple electronic links 1450, one burst queue 1425 for multiple electronic links 1450 and a separate scheduler 1455 and transmission controller 1445. A combined scheduler/transmission controller 1805 provides the same functionality as a separate scheduler 1455 and transmission controller 1445. The main advantage that the BAT board 1800 provides is that the burst assemblers 1440 and the burst queues 1425 are easier to design since they only have to process the data packets 405 from one electronic link 1450. The BAT board 1800 is also cheaper to design.

FIG. 19 shows a second alternative design 1900 for the burst assembly and transmission (BAT) board 1420 according to the present invention. The second alternative design 1900 for the BAT board 1420 includes multiple burst assemblers 1440, multiple electronic links 1450, multiple burst queues 1425, a combined scheduler and transmission controller 1805, a burst and BHP transmission module 1435, and multiple fibers 505. The BAT board 1900 has one burst assembler 1440 and one burst queue 1425 for each electronic link 1450 just as in the BAT board 1800. However, each burst queue 1425 in the BAT board 1900 is now associated with one burst transmitter 1435. Furthermore, when the data packets 405 arrive at the BAT board 1900, they are not stored in a shared memory. Instead, the data packets 405 are stored locally.

Figure 20:
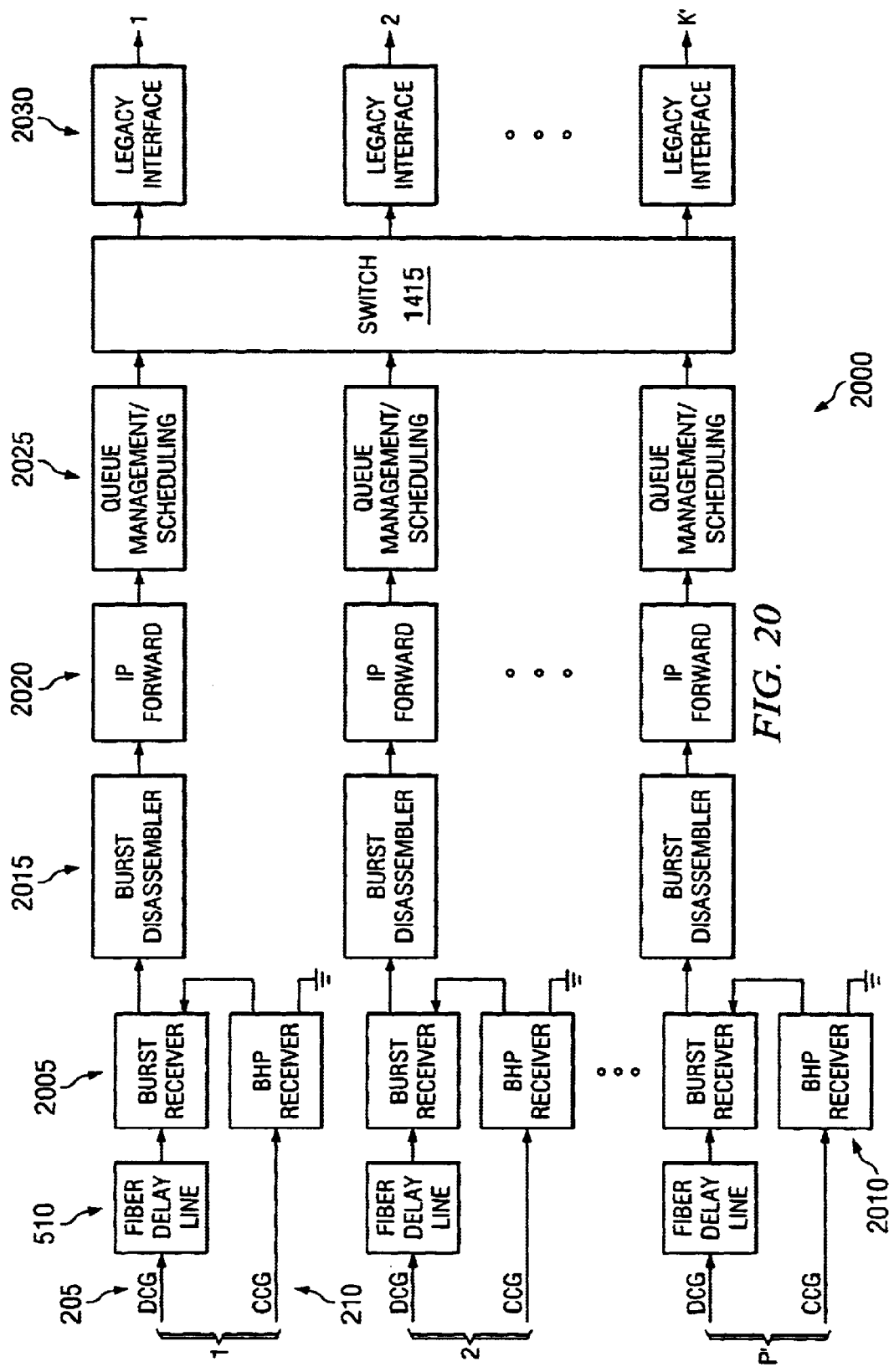
FIG. 20 shows one example of the functional architecture of the electronic egress edge router according to the present invention.

FIG. 20 shows one example of the functional architecture 2000 of the electronic egress edge routers 115 according to the present invention. The electronic egress edge router architecture 2000 includes multiple fiber delay lines (FDLs) 545, multiple burst receivers 2005, multiple burst header packet receivers 2010, multiple burst disassemblers 2015, multiple IP forwarders 2020, multiple queue management/scheduling blocks 2025, a switch 1415, and multiple legacy interfaces 2030. The architecture of the electronic 215 egress edge router 2000 will include one burst receiver 2005, one burst disassembler 2015, one IP forwarder 2020 and one queue management/scheduling module 2025 per data channel.

The burst payload 215 first enters a fiber delay line 545 through a data channel control group 205. Similarly, the burst header packet 220 first enters the burst header packet receivers 2010 through a control channel group 210. The function of the fiber delay line 545 is to delay the burst payload 215 for a while so the burst header packet receiver 2010 can process and read the information stored in the burst header packet 220. Once the burst header packet receiver 2010 reads the burst header packet 220 information and knows when the burst payload 215 is coming in, from which channel, and how long the burst payload 215 will last, the burst header packet receiver 2010 sends a signal with this information to the burst receiver 2005 directing the burst receiver 2005 to receive the burst payload 215 from the fiber delay line 545. Once the burst receiver 2005 correctly receives the burst payload 215, it sends the burst 430 to the burst disassembler 2015.

The function of the burst disassembler 2015 is to disassemble the burst 430 into the original data packets 405, which were assembled at the electronic ingress edge router 105. Burst 430 reordering can be performed in the burst disassembler 2015 if required. Any transmission error incurred on the burst 430 will be reported to the network management for further proper actions (e.g., retransmission of bursts 430 with errors). For burst payload reordering and retransmission, the related information carried by the burst header packet 220 need to be forwarded together with the burst 430 to the burst disassembler 2015. Next, the data packets 405 are transmitted into the IP forwarder 2020. The IP forwarder 2020 is basically a processor that contains a forwarding table. The function of the IP forwarder 2020 is to read the information from the header of the data packets 405, perform the forwarding table lookup, and determine where the data packets 405 should be outputted.

Next, the data packets 405 enter the queue management/scheduling block 2025. The queue management/scheduling block 2025 may have one or many queues. The queue management/scheduling block 2025 serves as a queue when there are several data packets 405 waiting to be switched through the switch 1415. The queue management/scheduling block 2025 can also prioritize the data packets 405 based on the information obtained from the IP forwarder 2020. The switch 1415 then switches the data packets 405 to the appropriate legacy interface 2030. The legacy interface then translates the data packet 405 into the format that conventional electronic routers would understand.

Electronic ingress edge routers assemble packets into bursts according to electronic egress edge router addresses and quality of service requirements. Providing quality of service for bursts at edge routers would be very similar to providing quality of service for data packets 405 at conventional electronic routers.

To prevent early burst 215 arrivals which results in burst 215 loss, burst header packets 220 have to be processed by the switch control unit 520 within the time period $\Delta$, the delay introduced by the input fiber delay line 545. Given this time constraint, four basic approaches are proposed to provide differentiated services (in terms of burst 215 loss) in the optical core router 110. These four basic approaches are suitable for any data channel scheduling algorithm, e.g., the LAUC-VF algorithm. Furthermore, a combination of these basic approaches can be used.

Figure 21:
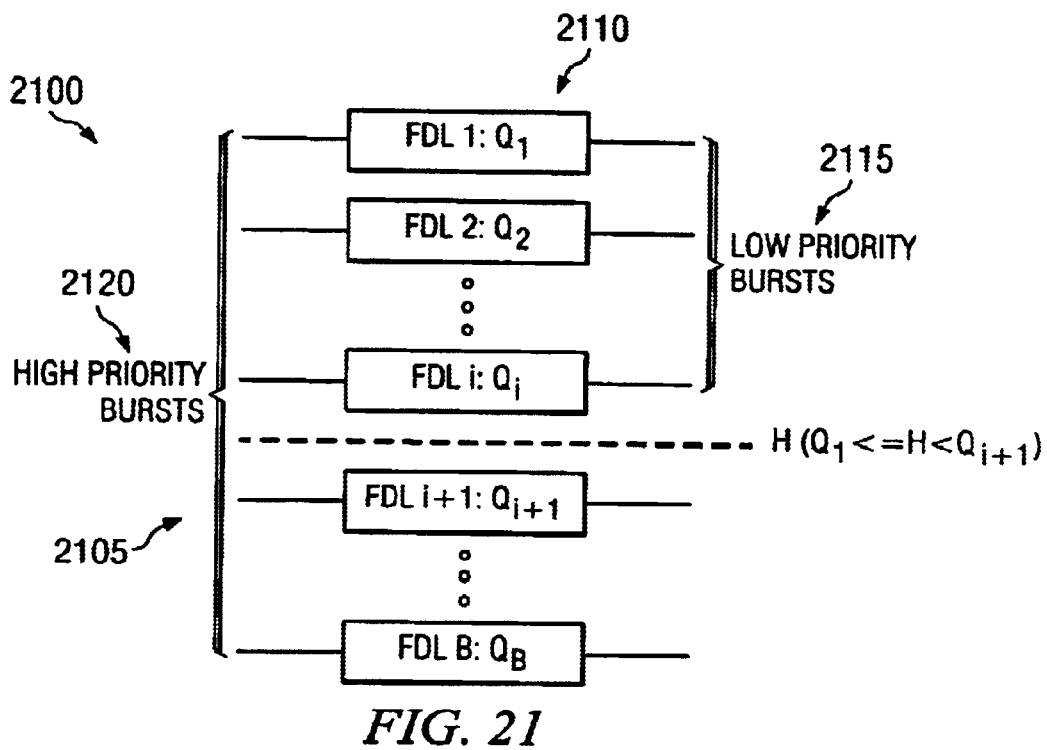
FIG. 21 shows a first approach to performing differentiated burst dropping, involving delay thresholds in fiber delay line buffers according to the present invention.

The first approach 2100 involving delay thresholds in fiber delay line buffers according to the present invention is illustrated in FIG. 21. A fiber delay line buffer 2105 consists of multiple fiber delay lines 2110. Suppose there are two traffic classes and the optical buffer has B fiber delay lines with $i^{th}$ FDL being able to delay $Q_i$ time, $1 \leq i \leq B \cdot Q_j > Q_i$ if $j \leq i$. Given a threshold H, $0 \leq H \leq Q_B$, a low priority burst 2115 can only be delayed no larger than H. In other words, low priority bursts 2115 can only use those fiber delay lines 2110 with delay no larger than H, while high priority bursts 2120 can use all the fiber delay lines 2110. Another embodiment of this approach is to define a subset $Q^s$ of all fiber delay lines, i.e., $Q^s \epsilon (Q_1, Q_2, \ldots, Q_B)$. Low priority bursts can only use those fiber delay lines belong to $Q^s$ while high priority bursts has no restriction in using fiber delay lines.

Figure 22:
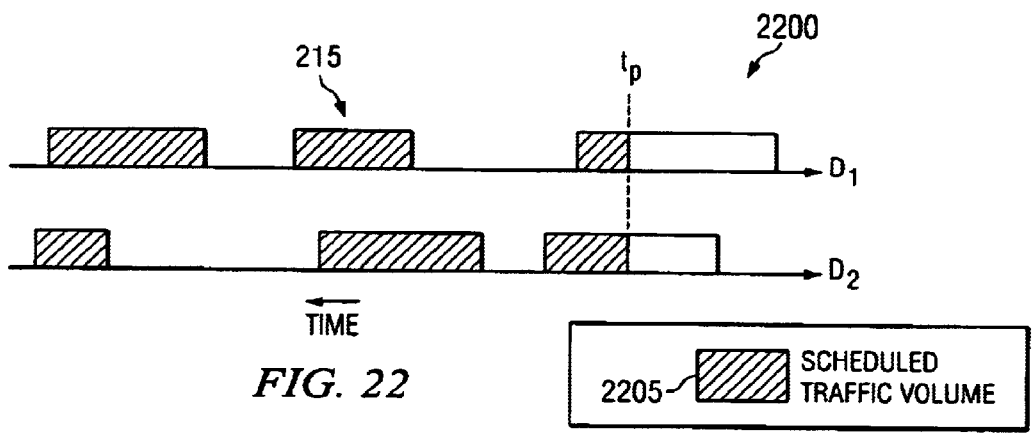
FIG. 22 shows a second approach to performing differentiated burst dropping, using the scheduled traffic volume thresholds according to the present invention.

The second approach 2200 involving scheduled traffic volume thresholds according to the present invention is illustrated in FIG. 22. The scheduled traffic volume 2205 is defined as the traffic volume expressed in time units that has already been scheduled to be transferred in a given time instant. The scheduled traffic volume V' 2205 at time instant $t_p$ in FIG. 22 is equal to the sum of all the burst durations on the left hand of $t_p$. Suppose the scheduler 625 starts to process a burst header packet 220 associated with a low priority burst 2115 at time $t_p$. If $V' \leq V$, a given threshold at time $t_p$, the burst payload 215 will be scheduled by the data channel scheduling algorithm (e.g., LAUC-VF). If V'>V, the burst header packet 220 and its associated burst payload 215 will be dropped. There is no restriction for the high priority traffic 2120.

Figure 23:
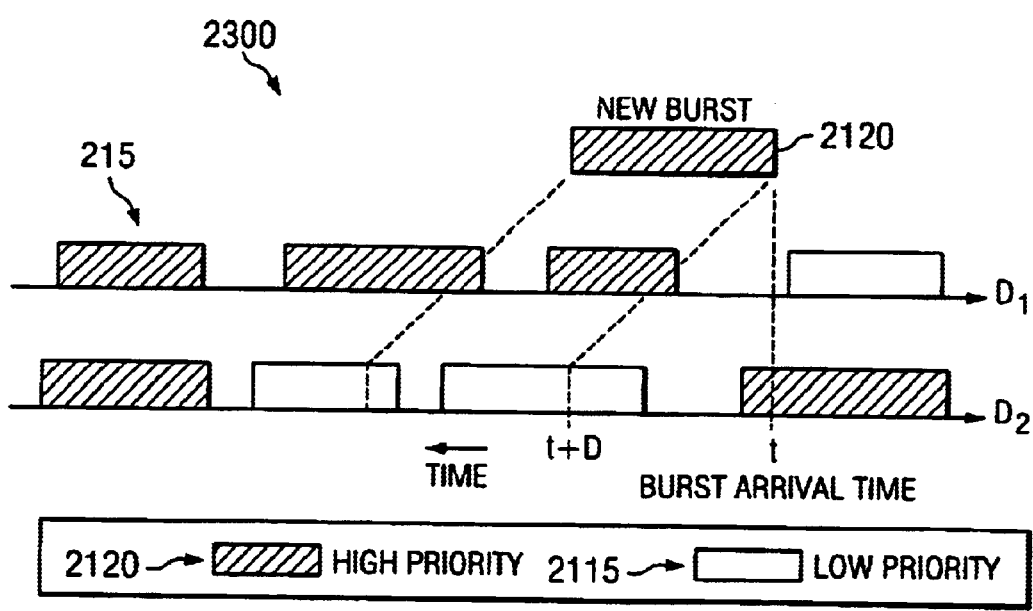
FIG. 23 shows a third approach to performing differentiated burst dropping, involving reservation over-write and rescheduling according to the present invention.

The third approach 2300 involving reservation over-write and rescheduling according to the present invention is illustrated in FIG. 23. The procedures are: (1) to schedule burst payloads 215 using a data channel scheduling algorithm (e.g., LAUC-VF); (2) for a high priority burst 2120, it can over-write reservations made by low priority bursts 2115 in case step (1) fails; and (3) to reschedule affected low priority bursts 2115 if possible (optional). In step (2), burst header packets associated with the over-written low priority bursts 2115 will be removed from the transmission controller. Without step (3), the over-written bursts are lost. An example is shown in FIG. 23 where the newly arriving high priority burst 2120 is scheduled after delay D and by over-writing the two scheduled low priority bursts 2115.

The fourth approach involves sliding-window based time-priority queues with reservation over-write. As the order of burst header packet 220 arrivals does not really reflect the order of burst payload 215 arrivals, burst header packets 220 are reordered according to their burst payload 215 arrivals in the scheduler and put in different queues according to their priorities. Burst header packets 220 that have to be scheduled in a given time window are served in a priority order. In this way, the early burst 215 arrival phenomenon can be avoided and high priority burst header packets 220 are served earlier. Hence, the number of reservation over-writing can be reduced.

Although the present invention has been described in detail, it should be understood that various changes, substitutions and alterations can be made hereto without departing from the spirit and scope of the invention as described by the appended claims.

What is claimed is:

1. A control system for switching data packets through an optical burst-switched network, comprising:
    an electronic ingress edge router operable to assemble a plurality of said data packets into a burst;
    a switch control unit at each hop operable to configure an optical switching matrix to switch said burst through said optical burst-switched network; and
    an electronic egress edge router operable to receive said burst from said optical burst-switched network and disassemble said burst into said plurality of data packets.

2. The system of claim 1, wherein said electronic ingress edge router is operable to assemble said plurality of data packets into said burst according to each said data packet's electronic egress edge router address and the quality of service information in each said data packet.

3. The system of claim 1, wherein said switch control unit at each hop is operable to configure a plurality of fiber delay line optical buffers.

4. The system of claim 1, wherein said data packet is comprised of a data packet header and a data packet payload.

5. The system of claim 1, wherein said burst is comprised of a burst header packet and a burst payload.

6. The system of claim 5, wherein said burst header packet is comprised of routing information and optical burst switching specific information including a synchronization hint which contains hints for the receiving egress edge router synchronization, an offset time specifying the offset time from a first bit of said burst header packet to a first bit of said burst payload, a burst duration specifying the duration of said burst payload, a burst bit rate which gives said bit rate at which said burst payload is transmitted, a data channel identifier specifying an identifier (ID) of said data channel on which said burst payload is sent, said QoS information specifying the quality of service to be received by said burst payload, a burst sequence number identifying said bursts having the same said electronic ingress and egress edge router addresses (said bursts may arrive out of order even if they follow the same path, and a cyclic redundancy check.

7. The system of claim 6, wherein said electronic ingress edge router comprises at least one burst assembly and transmission board operable to receive said plurality of data packets, said burst assembly and transmission board comprising:
    a burst assembler operable to assemble said plurality of data packets into said burst according to each said data packet's electronic edge router address and each said data packet's quality of service information;
    a shared memory operable to store said burst;
    a burst queue operable to receive and buffer said burst header packet and an address in said shared memory where said burst is stored;
    a first scheduler operable to receive said burst header packet and said address of said burst in said shared memory, find the earliest times to transmit said burst header packet and said burst, find associated data channels and control channels to transmit said burst and said burst header packet, respectively, and attach the time to send said burst header packet and said burst, said control channel ID, and said data channel ID to said burst header packet;
    a transmission controller operable to receive said burst header packet and said burst address in said shared memory from said first scheduler and to transmit said burst header packet and said burst at said times specified by said first scheduler; and a burst and burst header packet transmission module operable to receive said burst header packet, said control channel ID, said shared memory burst address, and said data channel ID from said transmission controller, use said shared memory burst address to retrieve said burst from said shared memory, generate said burst payload, and output said burst payload and said burst header packet to the appropriate said data channel and said control channel, respectively.

8. The system of claim 7, wherein said burst assembler comprises:
   a packet receiver operable to receive said plurality of data packets and transmit said plurality of data packets to said shared memory for storage;
   a processor operable to receive data packet headers of said plurality of data packets from said packet receiver and read said electronic egress router address from each said data packet header and determine which said electronic egress edge router to which each said data packet will be transmitted; and
   a plurality of buckets operable to store said shared memory address of each said data packet in a particular said bucket based on each said data packet's electronic egress router address and quality of service requirements.

9. The system of claim 8, wherein each said bucket comprises:
   a timer operable to record the elapsed time since the first said data packet arrives in said bucket; and
   a counter operable to record the number of bytes accumulated in said bucket.

10. The system of claim 7, wherein said burst and burst header packet transmission module comprises:
    a plurality of burst transmitters operable to receive said shared memory burst address and said data channel ID from said transmission controller and transmit said burst payload;
    a plurality of burst header packet transmitters operable to receive said burst header packet and said control channel ID from said transmission controller and transmit said burst header packet; and
    a plurality of electronic to optical converters operable to convert said burst payload or said burst header packet to a pre-specified wavelength.

11. The system of claim 7, wherein said burst assembly and transmission board comprises:
    a plurality of said burst assemblers;
    a plurality of said burst queues;
    said shared memory;
    a combined said first scheduler and said transmission controller module; and
    said burst and burst header packet transmission module.

12. The system of claim 7, wherein said burst assembly and transmission board comprises:
    a plurality of said burst assemblers;
    a plurality of said burst queues;
    said combined first scheduler and said transmission controller module; and
    said burst and burst header packet transmission module.

13. The system of claim 6, wherein said switch control unit comprises:
    a plurality of second schedulers operable to:
      read the burst payload timing information and said optical burst switching specific information from said burst header packet to determine when said burst payload will arrive at said optical switching matrix and how long said burst payload will last;
      determine if any outgoing data channels available are in said optical switching matrix at the time said burst payload is to arrive, either without using any fiber delay line, or using said fiber delay line from said plurality of fiber delay line buffers;
      determine the time to send out said burst header packet; and
      send configuration information;
    a plurality of switch controllers operable to:
      receive said configuration information from said scheduler; and
      configure said data channels in said switching matrix if any are available; and
    a plurality of burst header packet transmission modules operable to read said time to send information from said burst header packet and transmit said burst header packet at the appropriate time on an appropriate said control channel.

14. The system of claim 13, wherein said configuration information includes an incoming said data channel identifier, an outgoing said data channel identifier, a time to switch said burst payload, said burst payload duration, and a fiber delay line identifier specifying which said fiber delay line of said fiber delay line buffers to use.

15. The system of claim 13, wherein said second scheduler comprises:
    a scheduling queue operable to store said burst header packet;
    a burst header packet processor operable to receive said burst header packet from said scheduling queue, extract said burst payload timing information and said optical burst switching specific information, create said configuration information and modify said burst header packet;
    a data channel scheduling module operable to receive said burst payload timing information and said burst payload duration information from said burst header packet processor and search for an idle said outgoing data channel where said burst payload can be transmitted and inform said burst header packet processor when the first bit of said burst payload will leave said optical switching matrix (time-to-leave); and
    a control channel scheduling module operable to receive said burst payload time-to-leave information from said burst header packet processor and select a time to send said burst header packet to an outbound control channel group.

16. The system of claim 13, wherein said switch controller comprises:
    a time slot calculation processor operable to:
      receive said configuration information from said second scheduler;
      convert said configuration information into a format that said switch controller can understand; and
      calculate said appropriate time slot (ts) to configure said optical switching matrix according to the following formula:

$$ts = (p_c + \lceil (t_s - t_c)/\sigma \rceil) \bmod W_s$$

a plurality of tables/memory associated with said time slots operable to store said format; and
    a first time slot pointer operable to point said time slot currently configured.

17. The system of claim 13, wherein said burst header packet transmission module comprises a plurality of said time slots and a second time slot pointer operable to point to a current transmission time slot, each said time slot comprising:
- a flag operable to indicate if there is said burst header packet in said time slot to be transmitted; and
- a pointer which points to an address of said burst header packet when said flag is equal to one (1).

18. The system of claim 1, wherein said electronic egress edge router comprises:
- a plurality of burst header packet receivers operable to read said burst header packet and set said burst payload timing information;
- a plurality of said fiber delay lines operable to delay said burst payload;
- a plurality of burst receivers operable to receive a signal from said burst header packet receiver informing said burst receiver when and how to receive said burst payload from said fiber delay line; and
- a plurality of burst disassemblers operable to disassemble said burst into said plurality of data packets.

19. A method for switching data packets through an optical burst-switched network, comprising the steps of:
- assembling a plurality of data packets into a burst at an electronic ingress edge router;
- using a switch control unit to configure an optical switching matrix;
- switching said burst through said optical burst-switched network; and
- disassembling said burst into said plurality of data packets at an electronic egress edge router.

20. The method of claim 19, wherein said switch control unit is further operable to configure a plurality of fiber delay line optical buffers.

21. The method of claim 19, wherein said data packet is comprised of a data packet header and a data packet payload.

22. The method of claim 19, wherein said burst is comprised of a burst header packet and a burst payload.

23. The method of claim 22, wherein said burst header packet is comprised of routing information and optical burst switching specific information including a synchronization hint which contains hints for the receiving egress edge router synchronization, an offset time specifying said offset time from a first bit of said burst header packet to a first bit of said burst payload, a burst duration specifying the duration of said burst payload, a burst bit rate which gives said bit rate at which said burst payload is transmitted, a data channel identifier specifying an identifier (ID) of said data channel on which said burst payload is sent, a QoS information specifying the quality of service to be received by said burst payload, a burst sequence number identifying said bursts having the same said electronic ingress and egress edge router addresses (said bursts may arrive out of order even if they follow the same path, and a cyclic redundancy check.

24. The method of claim 19, wherein said plurality of data packets are assembled into said bursts according to each said data packet's electronic edge router address and/or each said data packet's quality of service information.

25. The method of claim 19, wherein said plurality of data packets are assembled into said burst at said electronic ingress edge router, comprising the steps of:
- receiving said plurality of data packets at a packet receiver;
- transmitting said plurality of data packets to a shared memory for storage;
- reading said electronic egress edge router address and said quality of service information from each said data packet header;
- determining which said electronic egress edge router to which each said data packet will be transmitted; and
- storing said shared memory address of each data packet in a bucket based on each said data packet's electronic egress router address and quality of service information forming said burst.

26. The method of claim 19, wherein said optical switching matrix is configured, comprising the steps of:
- reading said burst payload timing information and said optical burst switching information from said burst header packet at a first scheduler to determine when said burst payload will arrive at said optical switching matrix and how long said burst payload will last;
- determining if any outgoing data channels available are in said optical switching matrix at the time said burst payload is to arrive, either without using any said fiber delay line, or using said fiber delay line from a plurality of said fiber delay line buffers;
- transmitting said outgoing data channel configuration information to a switch controller if any said outgoing data channels are available;
- calculating a time slot to configure said optical switching matrix and said fiber delay line optical buffers based on said outgoing data channel configuration information; and
- configuring said optical switching matrix and said fiber delay line optical buffers at said time slot.

27. The method of claim 19, wherein said burst is disassembled into said plurality of data packets comprising the steps of:
- receiving said burst header packet at a burst header packet receiver;
- reading said burst header packet and set said burst payload timing information;
- receiving said burst payload at a fiber delay line;
- receiving a signal at a burst receiver from said burst header packet receiver informing said burst receiver when and how to receive said burst payload from said fiber delay line;
- receiving said burst payload at a burst disassembler; and
- disassembling said burst payload into said plurality of data packets.

28. The method of claim 19, wherein said electronic ingress edge router comprises a plurality of burst assembly and transmission boards operable to receive said plurality of data packets, said burst assembly and transmission board comprising:
- a burst assembler operable to assemble said plurality of data packets into said burst according to each said data packet's electronic edge router address and each said data packet's quality of service information;
- a shared memory operable to store said burst;
- a burst queue operable to receive and buffer said burst header packet and an address in said shared memory where said burst is stored;
- a first scheduler operable to receive said burst header packet and said address of said burst in said shared memory, find the earliest times to transmit said burst header packet and said burst, find associated data channels and control channels to transmit said burst and said burst header packet, respectively, and attach the time to send said burst header packet and said burst, said control channel ID, and said data channel ID to said burst header packet;

a transmission controller operable to receive said burst header packet and said burst address in said shared memory from said first scheduler and to transmit said burst header packet and said burst at said times specified by said first scheduler; and a burst and burst header packet transmission module operable to receive said burst header packet, said control channel ID, said shared memory burst address, and said data channel ID from said transmission controller, use said shared memory burst address to retrieve said burst from said shared memory, generate said burst payload, and output said burst payload and said burst header packet to the appropriate said data channel and said control channel, respectively.

29. The method of claim 28, wherein said burst assembler comprises:

said packet receiver operable to receive data packet headers of said plurality of data packets and transmit said plurality of data packets to said shared memory for storage;

a processor operable to receive said plurality of data packets from said packet receiver and read said electronic egress router address from each said data packet header and determine which said electronic egress edge router each said data packet will be transmitted to; and a plurality of buckets operable to store said shared memory address of each said data packet in a particular said bucket based on each said data packet's electronic egress router address.

30. The method of claim 29, wherein each said bucket comprises:

a timer operable to record the elapsed time since the first said data packet arrives in said bucket; and a counter operable to record the number of bytes accumulated in said bucket.

31. The method of claim 28, wherein said burst and burst header packet transmission module comprises:

a plurality of burst transmitters operable to receive said shared memory burst address and said data channel ID from said transmission controller, output said burst payload on said data channel;

a plurality of burst header packet transmitters operable to receive said burst header packet and said control channel ID from said transmission controller, output said burst header packet on said control channel; and a plurality of electronic to optical converters operable to convert said burst payload or said burst header packet to a pre-specified wavelength.

32. The method of claim 28, wherein said burst assembly and transmission board comprises:

a plurality of said burst assemblers;

a plurality of said burst queues;

said shared memory;

a combined first scheduler and said transmission module; and said burst and burst header packet transmission module.

33. The method of claim 28, wherein said burst assembly and transmission board comprises:

a plurality of said burst assemblers;

a plurality of said burst queues;

said combined first scheduler and said transmission module; and said burst and burst header packet transmission module.

34. The method of claim 23, wherein said switch control unit comprises:

said plurality of second schedulers operable to:
read said burst payload timing information and said optical burst switching specific information from said burst header packet to determine when said burst payload will arrive at said optical switching matrix and how long said burst payload will last;

determine if any outgoing data channels available are in said optical switching matrix at the time said burst payload is to arrive, either without using any fiber delay line, or using said fiber delay line from said plurality of fiber delay line buffers;

determine said time to send said burst header packet; and send configuration information;

a plurality of switch controllers operable to:
receive said configuration information from said scheduler; and configure said data channels in said switching matrix if any are available; and a plurality of burst header packet transmission modules operable to read said time to send information from said burst header packet and transmit said burst header packet at the appropriate time on an appropriate control channel.

35. The method of claim 34, wherein said configuration information includes an incoming said data channel identifier, an outgoing said data channel identifier, a time to switch said burst payload, said burst payload duration, and a fiber delay line identifier specifying which said fiber delay line of said fiber delay line buffers to use.

36. The method of claim 34, wherein said second scheduler comprises:

a scheduling queue operable to store said burst header packet;

a burst header packet processor operable to receive said burst header packet from said scheduling queue, extract said burst payload timing information and said optical burst switching specific information, create said configuration information and modify said burst header packet;

a data channel scheduling module operable to receive said burst payload timing information and said burst payload duration information from said burst header packet processor and search for an idle said outgoing data channel where said burst payload can be transmitted and inform said burst header packet processor when the first bit of said burst payload will leave said optical switching matrix (time-to-leave); and a control channel scheduling module operable to receive said burst payload time-to-leave information from said burst header packet processor and select a time to send said burst header packet to an outbound control channel group.

37. The method of claim 34, wherein said switch controller comprises:

a time slot calculation processor operable to:
receive said configuration information from said second scheduler; and convert said configuration information into a format that said switch controller can understand; and calculate said appropriate time slot (ts) to configure said optical switching matrix according to the following formula:

$$ts = (p_c + \lceil (t_s - t_c)/\sigma \rceil) \bmod W_s$$

a plurality of tables/memory associated with said time slots operable to store said format; and a first time slot pointer operable to point said time slot currently configured.

38. The method of claim 34, wherein said burst header packet transmission module comprises:

a flag operable to indicate if there is said burst header packet in said time slot to be transmitted; and a pointer which points to an address of said burst header packet when said flag is equal to one (1).

39. The method of claim 19, wherein said electronic egress edge router comprises:

said plurality of burst header packet receivers operable to read said burst header packet and set burst payload timing information from said burst header packet;

said plurality of said fiber delay lines operable to delay said burst payload;

said plurality of burst receivers operable to receive a signal from said burst header packet receiver informing said burst receiver when and how to receive said burst payload from said fiber delay line; and said plurality of burst disassemblers operable to disassemble said burst into said plurality of data packets.

40. A method for managing an offset-time ($\tau$) between a burst header packet and its corresponding burst payload during transmission between hops, comprising the steps of:

setting an initial offset-time $\tau_0$;

resynchronizing said burst payload and said burst header packet at each hop so said offset-time ($\tau$) is kept as close to said initial offset-time $\tau_0$ as possible; and using a departure time of said burst payload from said optical switching matrix rather than an actual switching time of said burst payload inside said optical switching matrix as a reference time to schedule the transmission of said burst header packet on said outgoing control channel group to guard any portion of said burst payload from being cut.

41. A burst assembler mechanism, comprising:

a packet receiver operable to receive a plurality of data packets from a first switch and transmit said plurality of data packets to a shared memory for storage;

a processor operable to receive data packet headers of said plurality of data packets from said packet receiver and read an electronic egress router address and quality of service information from each said data packet headers and determine which said electronic egress edge router each said data packet will be transmitted to; and a plurality of buckets operable to store said shared memory address of each data packet in a particular said bucket based on each said data packet's electronic egress router address and quality of service information.

42. The system of claim 5, wherein said burst header packet and said burst payload are separately transmitted and switched.

43. The method of claim 22, wherein said burst header packet and said burst payload are separately transmitted and switched.

* * * * *